US011536858B2

(12) United States Patent
Tadokoro et al.

(10) Patent No.: US 11,536,858 B2
(45) Date of Patent: Dec. 27, 2022

(54) RADIATION MONITOR AND RADIATION MEASUREMENT METHOD

(71) Applicant: HITACHI, LTD., Tokyo (JP)

(72) Inventors: Takahiro Tadokoro, Tokyo (JP); Yuichiro Ueno, Tokyo (JP); Katsunori Ueno, Tokyo (JP); Kouichi Okada, Tokyo (JP); Shuichi Hatakeyama, Tokyo (JP); Yasushi Nagumo, Tokyo (JP); Takahiro Itou, Tokyo (JP); Yoshinobu Sakakibara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 446 days.

(21) Appl. No.: 16/645,513

(22) PCT Filed: Aug. 30, 2018

(86) PCT No.: PCT/JP2018/032166
§ 371 (c)(1),
(2) Date: Mar. 9, 2020

(87) PCT Pub. No.: WO2019/092955
PCT Pub. Date: May 16, 2019

(65) Prior Publication Data
US 2020/0278458 A1  Sep. 3, 2020

(30) Foreign Application Priority Data
Nov. 10, 2017 (JP) .............................. JP2017-217545

(51) Int. Cl.
*G01T 1/20* (2006.01)
*G01T 1/02* (2006.01)

(52) U.S. Cl.
CPC ............ *G01T 1/2002* (2013.01); *G01T 1/023* (2013.01); *G01T 1/201* (2013.01); *G01T 1/20185* (2020.05)

(58) Field of Classification Search
CPC .... G01T 1/2002; G01T 1/20185; G01T 1/023
See application file for complete search history.

(56) References Cited

U.S. PATENT DOCUMENTS 5,424,546 A   6/1995  Okada et al.
6,313,465 B1  11/2001 Nittoh et al.
(Continued)

FOREIGN PATENT DOCUMENTS

JP   02-206786 A   8/1990
JP   06-214035 A   8/1994
(Continued)

OTHER PUBLICATIONS

Japanese Office Action received in corresponding Japanese Application No. 2017-217545 dated May 11, 2021.
(Continued)

*Primary Examiner* — Hugh Maupin
(74) *Attorney, Agent, or Firm* — Mattingly & Malur, PC

(57) ABSTRACT

Provided is a radiation monitor and the like capable of appropriately measuring radiation. A radiation monitor (100) includes: radiation detection units (11, 12); optical fibers (13p, 13q) that transmit light generated by a plurality of radiation detection elements (11a, 12a) to merge; a light detection unit (14) that converts the light after merging guided to the light detection unit into an electric pulse; a measurement device (15) that calculates a dose rate of radiation based on a count rate of the electric pulses; and an analysis/display device (16). Housings (11b, 12b) include a housing (11b) made of a first material and another housing (12b) made of a second material.

10 Claims, 14 Drawing Sheets

(56) References Cited

U.S. PATENT DOCUMENTS

| | | | |
|---|---|---|---|
| 2002/0117614 A1 | 8/2002 | More et al. | |
| 2009/0014665 A1 | 1/2009 | Fleming et al. | |
| 2012/0061591 A1* | 3/2012 | Yoder | G01T 1/10 |
| | | | 250/485.1 |
| 2018/0074214 A1* | 3/2018 | Magne | G01T 1/201 |

FOREIGN PATENT DOCUMENTS

| | | |
|---|---|---|
| JP | 10-90414 A | 4/1998 |
| JP | 11-271453 A | 10/1999 |
| JP | 2004-191134 A | 7/2004 |
| JP | 2004-233283 A | 8/2004 |
| JP | 2007-327967 A | 12/2007 |
| JP | 2011-185955 A | 9/2011 |
| JP | 2016-114392 A | 6/2016 |
| JP | 2018-036204 A | 3/2018 |
| WO | 2005/008287 A1 | 1/2005 |
| WO | 2018/043068 A1 | 3/2018 |

OTHER PUBLICATIONS

Extended European Search Report received in corresponding European Application No. 18875994.8 dated Jun. 18, 2021.
International Search Report of PCT/JP2018/032166 dated Oct. 9, 2018.

* cited by examiner

RADIATION MONITOR AND RADIATION MEASUREMENT METHOD

TECHNICAL FIELD

The present invention relates to a radiation monitor and the like.

BACKGROUND ART

Known types of radiation monitors include semiconductor detectors and the like in addition to so-called gas detection units and scintillation detection units. However, it is difficult to properly measure radiation with any of the above-described types under an environment with a high dose rate. Therefore, as a radiation monitor capable of measuring radiation even under the environment with the high dose rate, for example, a technique described in PTL 1 below is known.

That is, PTL 1 describes a radiation monitor including "a radiation emitting element having a light emitting unit emitting light of an intensity corresponding to a dose rate of incident radiation, . . . , and an electric pulse converter which is connected to the optical fiber and transmits one electric pulse for one photon of the transmitted light".

CITATION LIST

Patent Literature

PTL 1: JP 2016-114392 A

SUMMARY OF INVENTION

Technical Problem

However, in a radiation measurement environment (for example, a nuclear power plant), radiation beams of various energies coexist, and radiation enters the radiation emitting element at various incident angles. Therefore, even if the technique described in PTL 1 is used, the sensitivity to radiation is too high or too low depending on the energy of the radiation or the magnitude of the incident angle. That is, there is room for further enhancement of radiation measurement accuracy regarding the radiation monitor described in PTL 1.

Therefore, an object of the present invention is to provide a radiation monitor or the like capable of appropriately measuring radiation.

Solution to Problem

In order to solve the above problems, the present invention includes: a plurality of radiation detection units each of which includes a radiation detection element that emits light with incidence of radiation, and a housing that houses the radiation detection element; an optical transmission line that transmits light generated by the plurality of radiation detection elements to merge; a light detection unit that converts the light after merging guided to the light detection unit through the optical transmission line into an electric pulse; and an analysis unit that calculates a dose rate of radiation based on a count rate of the electric pulse, the plurality of housings including at least one housing made of a first material and another housing made of a second material.

Advantageous Effects of Invention

According to this invention, it is possible to provide the radiation monitor and the like capable of appropriately measuring radiation.

DESCRIPTION OF EMBODIMENTS

First Embodiment

Configuration of Radiation Monitor

Figure 1:
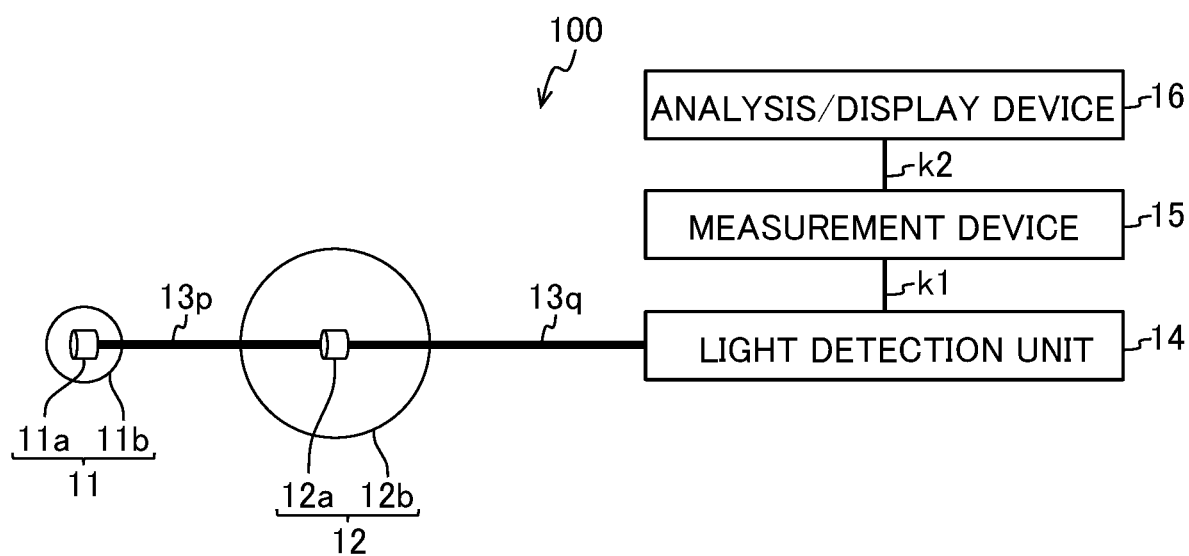
FIG. 1 is a configuration diagram of a radiation monitor according to a first embodiment of the present invention.

FIG. 1 is a configuration diagram of a radiation monitor 100 according to a first embodiment.

Incidentally, optical fibers 13$p$ and 13$q$ are illustrated by thick lines, and wirings k1 and k2 are illustrated by thin lines in FIG. 1.

The radiation monitor 100 is a device that measures a dose rate of radiation. As illustrated in FIG. 1, the radiation monitor 100 includes radiation detection units 11 and 12, the optical fibers 13$p$ and 13$q$ (optical transmission lines), a light detection unit 14, a measurement device 15 (analysis unit), and an analysis/display device 16 (analysis unit).

The radiation detection units 11 and 12 detect radiation incident on themselves, and are arranged at radiation measurement target points. As illustrated in FIG. 1, one radiation detection unit 11 includes a radiation detection element 11$a$ and a housing 11$b$. The other radiation detection unit 12 also includes a radiation detection element 12$a$ and a housing 12$b$ (another housing).

Each of the radiation detection elements 11$a$ and 12$a$ has a property of emitting light with incidence of radiation. As such radiation detection elements 11$a$ and 12$a$, for example, a scintillation element containing a rare earth element in yttrium aluminum garnet, which is a base material, can be used. Examples of the rare earth element include praseodymium in addition to neodymium, ytterbium, and cerium.

In the present embodiment, a case where the radiation detection elements 11$a$ and 12$a$ are Nd:YAG (neodymium-added yttrium aluminum garnet) will be described as an example. When radiation, such as gamma rays, is incident on the Nd:YAG, photons having an emission wavelength of about 1064 nm are generated.

More specifically, when radiation is incident on Nd:YAG, the energy of the radiation causes an energy level of the rare earth element and the like contained in Nd:YAG to transition to a predetermined excited state. Then, when transiting from the above-described excited state to a ground state having a low energy level, photons having an emission wavelength of about 1064 nm are generated in Nd:YAG. In this manner, it is possible to suppress deterioration of the optical fibers 13$p$ and 13$q$ accompanying transmission of light by using Nd:YAG having an emission wavelength of 800 nm or more as the radiation detection elements 11$a$ and 12$a$.

Incidentally, when radiation is incident on Nd:YAG, not only photons having the emission wavelength of about 1064 nm are generated, but also photons having a wavelength different from 1064 nm are also generated although the number of such photons is small. That is, the "emission wavelength" of the radiation detection elements 11$a$ and 12$a$ means a wavelength at which a photon generation rate is higher than other wavelengths.

The housing 11$b$ illustrated in FIG. 1 is a spherical shell-like member having a predetermined thickness that houses the radiation detection element 11$a$. Then, the radiation detection element 11$a$ is arranged at the center of the housing 11$b$. According to such a configuration, the thickness of the housing 11$b$ when radiation passes through the housing 11$b$ toward the radiation detection element 11$a$ becomes substantially constant regardless of the magnitude of the incident angle of the radiation. As a result, the sensitivity of the radiation detection unit 11 with respect to the radiation can be made substantially constant regardless of the magnitude of the incident angle of the radiation. Incidentally, tungsten is used as a material (first material) forming the housing 11$b$ in the example of the present embodiment.

The other housing 12$b$ is a spherical shell-like member that houses the radiation detection element 12$a$. In the example of the present embodiment, stainless steel (so-called "SUS") is used as a material (second material) forming the housing 12$b$. One of the main features of the present embodiment is that the housings 11$b$ and 12$b$ are made of different kinds of materials.

Note that there may be almost no gap between the radiation detection element 11$a$ and the housing 11$b$ (that is, the radiation detection unit 11 is solid), and the above-described gap may exist. The same applies to the other radiation detection unit 12.

Further, a size of each of the housings 11$b$ and 12$b$ (a size of each circle) in FIG. 1 indicates the thickness of each of the housings 11$b$ and 12$b$. That is, the housing 12$b$ is thicker than the housing 11$b$.

The optical fibers 13$p$ and 13$q$ illustrated in FIG. 1 are optical transmission lines that transmit light generated by the respective radiation detection elements 11$a$ and 12$a$ to merge. Incidentally, the matter of causing light to "merge" means that (a part of) an optical transmission line guiding light from the radiation detection element 11$a$ to the light detection unit 14 and an optical transmission line guiding light from the radiation detection element 12$a$ to the light detection unit 14 are formed in common as the optical fiber 13$q$.

The optical fiber 13$p$ has one end connected to the radiation detection element 11$a$ and the other end connected to the radiation detection element 12$a$. Further, the other optical fiber 13$q$ has one end connected to the radiation detection element 12$a$ and the other end connected to the light detection unit 14.

That is, the radiation detection elements 11$a$ and 12$a$ are connected in series through the optical fibers 13$p$ and 13$q$. Such a configuration is also one of the main features of the present embodiment. Then, the light generated by the radiation detection elements 11$a$ and 12$a$ merge in the optical fiber 13$q$, and the light after merging is guided to the light detection unit 14.

Figure 2:
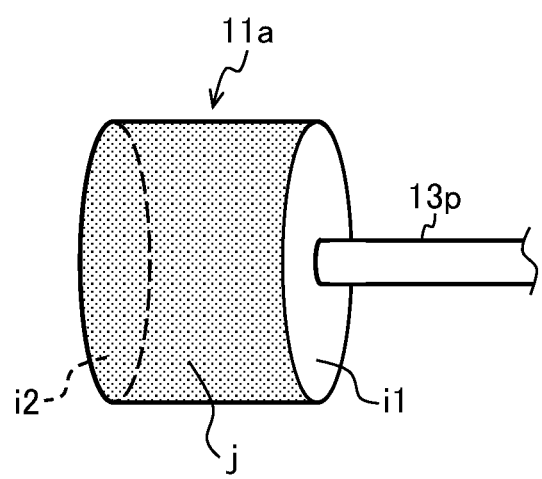
FIG. 2 is a partially enlarged view including a connection point between a radiation detection element and an optical fiber in the radiation monitor according to the first embodiment of the present invention.

FIG. 2 is a partially enlarged view including a connection portion between the radiation detection element 11$a$ and the optical fiber 13$p$. Incidentally, FIG. 2 does not illustrate the housing 11$b$ (see FIG. 1).

In the example illustrated in FIG. 2, a predetermined optical polishing is performed on one end face i1 (polished portion) of the radiation detection element 11$a$ having a columnar shape. The optical fiber 13$p$ is connected to the end face ii that has been made to easily transmit light by such optical polishing. As a result, the light generated by the radiation detection element 11a is appropriately guided to the optical fiber 13p through the end face i1.

Incidentally, the matter that the optical fiber 13p is "connected" to the end face i1 includes not only a configuration where one end of the optical fiber 13p is in close contact with the end face i1 but also a configuration where one end of the optical fiber 13p is brought to face close to the end face i1.

Further, a light-reflecting material j is provided on the other end face i2 and a peripheral wall surface of the radiation detection element 11a. As such a light-reflecting material j, for example, gold or silver having a high light reflectance and a low heat radiation rate (also referred to as emissivity) can be used. As a result, a predetermined ratio of the photons generated by the radiation detection element 11a is transmitted through the optical fiber 13p. Further, thermal radiation (noise) from the light-reflecting material j is suppressed even under a high-temperature environment, so that an error in radiation detection can be reduced.

In this manner, the radiation detection element 11a is optically polished in the vicinity (the end face i1) of the connection point with the optical fiber 13p, and the light-reflecting material j is provided in a region (the end face i2 and the peripheral wall surface) other than the vicinity of the above-described connection point. Incidentally, light slightly leaks at the end face i1 of the radiation detection element 11a, but an error caused by this leakage of light is corrected by the analysis/display device 16 (see FIG. 1) based on a preliminary experiment.

On the other hand, the columnar radiation detection element 12a illustrated in FIG. 1 is optically polished at both the end faces thereof (end faces to which the optical fibers 13p and 13q are connected), and the light-reflecting material (not illustrated) is provided on the peripheral wall surface thereof.

For example, photons generated by the radiation detection element 11a due to the incidence of radiation are guided to the light detection unit 14 through the optical fiber 13p, the radiation detection element 12a, and the optical fiber 13q in order. Incidentally, both the radiation detection elements 11a and 12a are light-transmissive (transparent or translucent), and thus, attenuation of light in the radiation detection elements 11a and 12a is relatively small.

Meanwhile, photons generated by the radiation detection element 12a due to the incidence of radiation are guided to the light detection unit 14 through the optical fiber 13q. That is, photons incident on the light detection unit 14 include the photons generated by the radiation detection element 11a and the photons generated by the radiation detection element 12a.

Note that there are also photons guided from the radiation detection element 12a to the other radiation detection element 11a through the optical fiber 13p. Such photons are reflected by the light-reflecting material j (see FIG. 2), and then, guided to the light detection unit 14 through the optical fiber 13p, the transmissive radiation detection element 12a, and the optical fiber 13q in order. In this manner, the light generated by the radiation detection elements 11a and 12a merge, and the light after merging is guided to the light detection unit 14. Incidentally, due to the energy of light generated on one of the radiation detection elements 11a and 12a, the other rarely emits light in a chain.

The light detection unit 14 illustrated in FIG. 1 converts the light after merging (pulsed light) guided to itself through the optical fiber 13q into an electric pulse (a light detection process). More specifically, when one photon is incident on the light detection unit 14, one electric pulse is generated by photoelectric conversion. As such a light detection unit 14, for example, a photomultiplier tube or a photodiode can be used.

The inventors have found that there is a proportional relationship between the dose rate of the radiation incident on the radiation detection element 11a and the number of photons generated by the radiation detection element 11a per unit time through experiments (the same applies to other radiation detection elements 12a). In the present embodiment, the number (count rate) of electric pulses output from the light detection unit 14 to the measurement device 15 per unit time is converted into the dose rate of radiation based on such a proportional relationship.

The measurement device 15 is a device that measures the count rate of the electric pulses input from the light detection unit 14, and is connected to the light detection unit 14 through the wiring k1. The measurement device 15 includes electronic circuits such as a central processing unit (CPU), a read only memory (ROM), a random access memory (RAM), and various interfaces although not illustrated. Then, a program stored in the ROM is read and loaded in the RAM so that the CPU executes various processes.

Although not illustrated, the analysis/display device 16 also includes electronic circuits such as a CPU, a ROM, a RAM, and various interfaces, and is connected to the measurement device 15 through the wiring k2. The analysis/display device 16 calculates the dose rate of radiation based on the count rate of the electric pulses input from the measurement device 15 (an analysis process), and displays a calculation result. Incidentally, the count rate of the electric pulses and the dose rate of the radiation are in a proportional relationship, and the proportional coefficient is stored in the analysis/display device 16 in advance.

As described above, the radiation detection units 11 and 12 illustrated in FIG. 1 are arranged at radiation measurement target points. On the other hand, the light detection unit 14, the measurement device 15, and the analysis/display device 16 are arranged, for example, in a control room (not illustrated) of a nuclear power plant.

Figure 3:
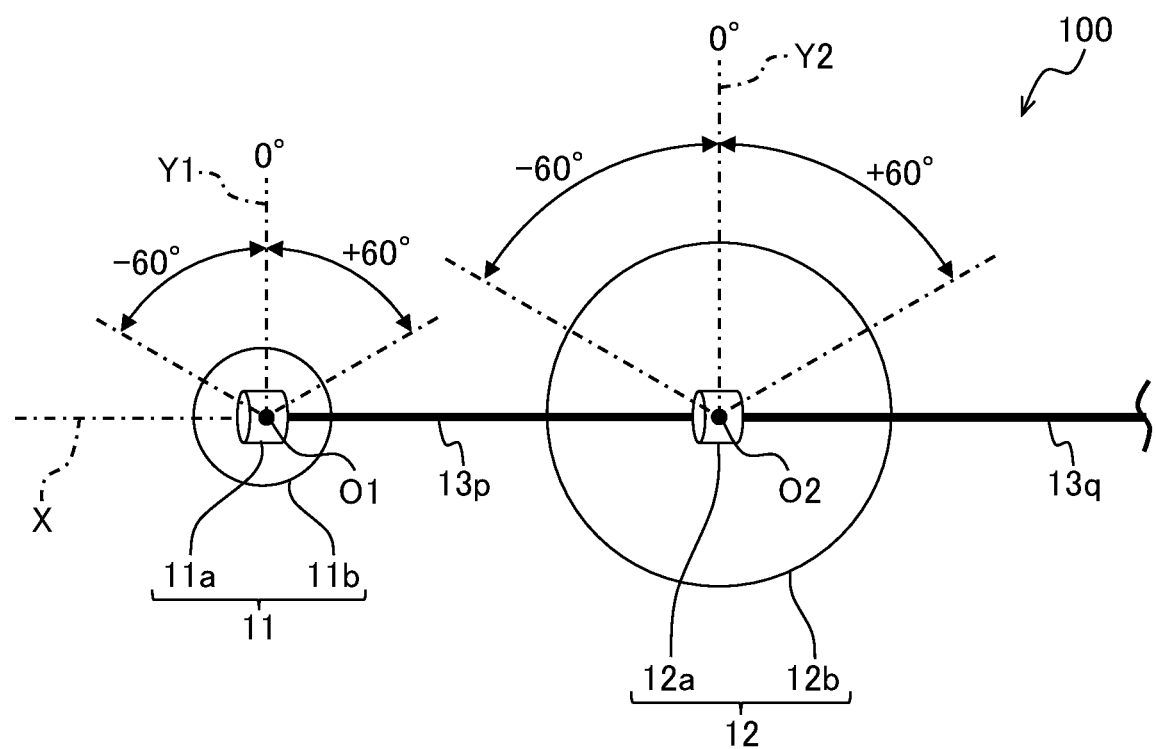
FIG. 3 is an explanatory view illustrating an arrangement of each radiation detection unit provided in the radiation monitor according to the first embodiment of the present invention.

FIG. 3 is an explanatory view illustrating the arrangement of the radiation detection units 11 and 12.

In the example illustrated in FIG. 3, the radiation detection units 11 and 12 are arranged such that center axes X of the columnar radiation detection elements 11a and 12a are located on substantially the same straight line. A reference line Y1 is a line segment indicating a reference direction of an incident angle of the radiation with respect to the radiation detection unit 11. The reference line Y1 passes through a center O1 of the spherical shell-like housing 11b, and is perpendicular to the center axis X of the radiation detection element 11a. Incidentally, the same applies to a reference line Y2 for the radiation detection unit 12. Directions in which these reference lines Y1 and Y2 are set are arbitrary.

Incidentally, it is preferable that the other housing 12b not be arranged within a predetermined angle range ($-60° \leq \theta \leq +60°$) from the reference line Y1 ($\theta=0°$) passing through one housing 11b, in consideration of the International electrotechnical commission standard (IEC standard). Similarly, it is preferable that one housing 11b not be arranged within a predetermined angle range ($-60° \leq \theta \leq +60°$) from the reference line Y2 ($\theta=0°$) passing through the other housing 12b. As a result, one of the radiation detection units 11 and 12 does not become a hindrance against the other so that the radiation detection error can be reduced.

Characteristics of Each Radiation Detection Unit

Hereinafter, first, a description will be given regarding radiation sensitivity characteristics (see FIG. 4) when only the radiation detection unit 12 (the housing 12b illustrated in FIG. 1 is made of stainless steel) is used and the other radiation detection unit 11 is omitted.

Subsequently, a description will be given regarding radiation sensitivity characteristics (see FIG. 5) when only the radiation detection unit 11 (the housing 11b illustrated in FIG. 1 is made of tungsten) is used and the other radiation detection unit 12 is omitted.

Further, a description will be given regarding sensitivity characteristics (see FIGS. 6 and 7) of the radiation monitor 100 of the present embodiment including both the radiation detection units 11 and 12.

Figure 4:
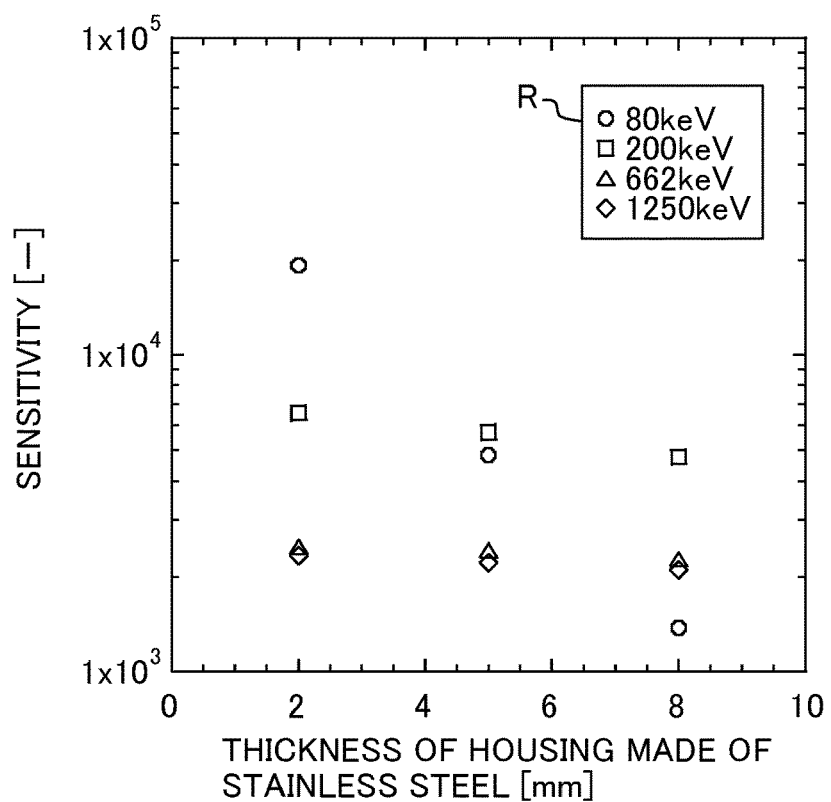
FIG. 4 is a characteristic view in the case of using only a radiation detection unit having a housing made of stainless steel.

FIG. 4 is a characteristic view in the case of using only the radiation detection unit 12 including the housing 12b made of stainless steel.

Incidentally, the horizontal axis in FIG. 4 represents the thickness of the stainless steel housing 12b, and the vertical axis represents the sensitivity to radiation (gamma rays). This sensitivity is proportional to the number of photons generated by the radiation detection element 12a per unit time. A legend in a square frame R in FIG. 4 indicates the energy of radiation.

As illustrated in FIG. 4, regarding radiation of each energy, the sensitivity to the radiation decreases as the thickness of the stainless steel housing 12b increases. This is because the energy and a flux (also referred to as a fluence rate) of the radiation decrease due to Compton scattering and the like in the housing 12b. Further, the smaller the energy of the radiation is, the greater a decrease rate in sensitivity to the thickness of the housing 12b becomes.

Note that the sensitivity of the radiation detection unit 12 is affected by the thickness of the spherical shell-shaped housing 12b as described above, but the influence of the diameter (size) of the housing 12b on the sensitivity is relatively small.

In the present embodiment, the stainless steel housing 12b having a thickness of 7.5 mm is used as an example in consideration of the characteristics illustrated in FIG. 4 (such data is not illustrated in FIG. 4). Incidentally, when only such a radiation detection unit 12 is used and the other radiation detection unit 11 is omitted, the following situation may occur.

That is, for high-energy radiation, the sensitivity to radiation falls within a predetermined allowable range (within the IEC standard range to be described later). However, the sensitivity is too high for radiation with a low energy of about 200 keV. Specifically, when radiation with an energy of 200 keV is applied, the radiation detection unit 12 reacts sensitively with a sensitivity of 4000 or more. In consideration of such a situation, if the stainless steel housing 12b is too thick, the sensitivity of the radiation detection unit 12 to high-energy radiation becomes low.

Figure 5:
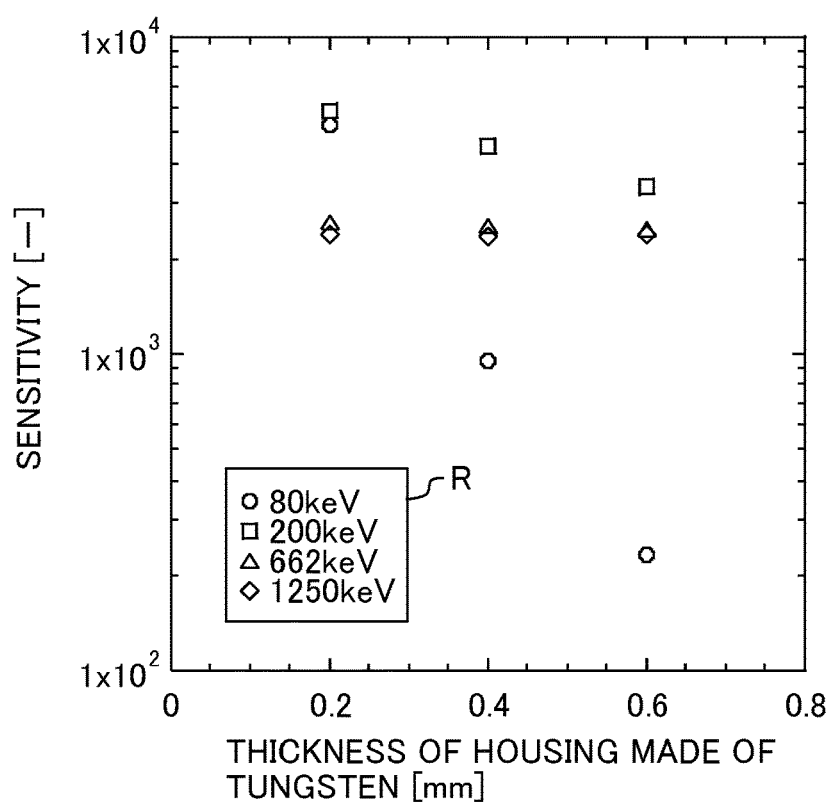
FIG. 5 is a characteristic view in the case of using only a radiation detection unit having a housing made of tungsten.

FIG. 5 is a characteristic view in the case of using only the radiation detection unit 11 including the housing 11b made of tungsten.

Incidentally, the horizontal axis in FIG. 5 represents the thickness of the tungsten housing 11b, and the vertical axis represents the sensitivity to radiation (gamma rays). As illustrated in FIG. 5, regarding radiation of each energy, the sensitivity to the radiation decreases as the thickness of the housing 11b increases. This is because the energy and a flux of the radiation decrease due to Compton scattering and the like in the housing 11b. Further, the smaller the energy of the radiation is, the greater a decrease rate in sensitivity to the thickness of the housing 11b becomes.

In the present embodiment, the housing 11b having a thickness of 2.5 mm is used as an example in consideration of the characteristics illustrated in FIG. 5 (such data is not illustrated in FIG. 5). The above radiation detection unit 11 has a relatively low sensitivity to low-energy radiation, and has a predetermined sensitivity to high-energy radiation.

Next, characteristics in a case where the radiation detection unit 11 including the tungsten housing 11b and the radiation detection unit 12 including the stainless steel housing 12b are optically connected in series will be described with reference to FIGS. 6 and 7.

Figure 6:
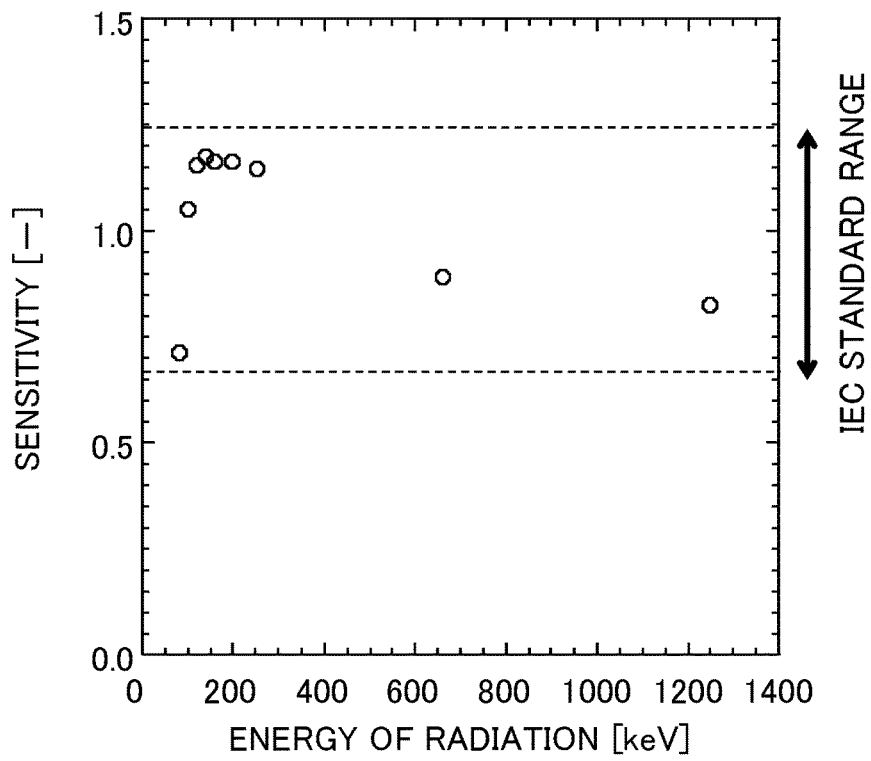
FIG. 6 is an experimental result illustrating energy characteristics of the radiation monitor according to the first embodiment of the present invention.

FIG. 6 is an experimental result illustrating energy characteristics of the radiation monitor 100 (see FIG. 1 as appropriate).

Incidentally, the horizontal axis in FIG. 6 represents the energy of radiation (gamma rays), and the vertical axis represents the sensitivity to the radiation. Incidentally, in data illustrated in FIG. 6, a thickness of the tungsten housing 11b is 2.5 mm, and a thickness of the stainless steel housing 12b is 7.5 mm (the same applies to FIG. 7).

Further, good results with small radiation measurement errors were obtained when a diameter φ of the radiation detection element 11a having the columnar shape (diameter of circles of the end faces i1 and i2 illustrated in FIG. 2), and a height h of this column are set to be substantially the same (for example, φ=h=2 mm) (the same applies to the other radiation detection element 12a).

As described above, the radiation detection unit 12 including the stainless steel housing 12b is sensitive to the high-energy radiation, and has a predetermined sensitivity to low-energy radiation. On the other hand, the radiation detection unit 11 including the tungsten housing 11b has a relatively low sensitivity to low-energy radiation, and has a predetermined sensitivity to high-energy radiation.

When both the housings 11b and 12b having different materials and thicknesses are used, the sensitivity to radiation can be kept within a predetermined IEC standard range regardless of the magnitude of radiation energy as illustrated in FIG. 6. Since the radiation detection elements 11a and 12a are light-transmissive as described above, the radiation detection elements 11a and 12a rarely hinder light transmission even if connected in series.

Incidentally, a light attenuation filter (not illustrated) may be additionally provided when the number (total number) of photons generated by the radiation detection elements 11a and 12a per unit time exceeds an upper limit value that allows photoelectric conversion by the light detection unit 14. For example, the light attenuation filter may be provided in a stage preceding the light detection unit 14, or the light attenuation filter may be provided between the radiation detection elements 11a and 12a. Further, the types of the radiation detection elements 11a and 12a and the materials and thicknesses of the housings 11b and 12b may be appropriately selected such that the light attenuation filter becomes unnecessary.

Figure 7:
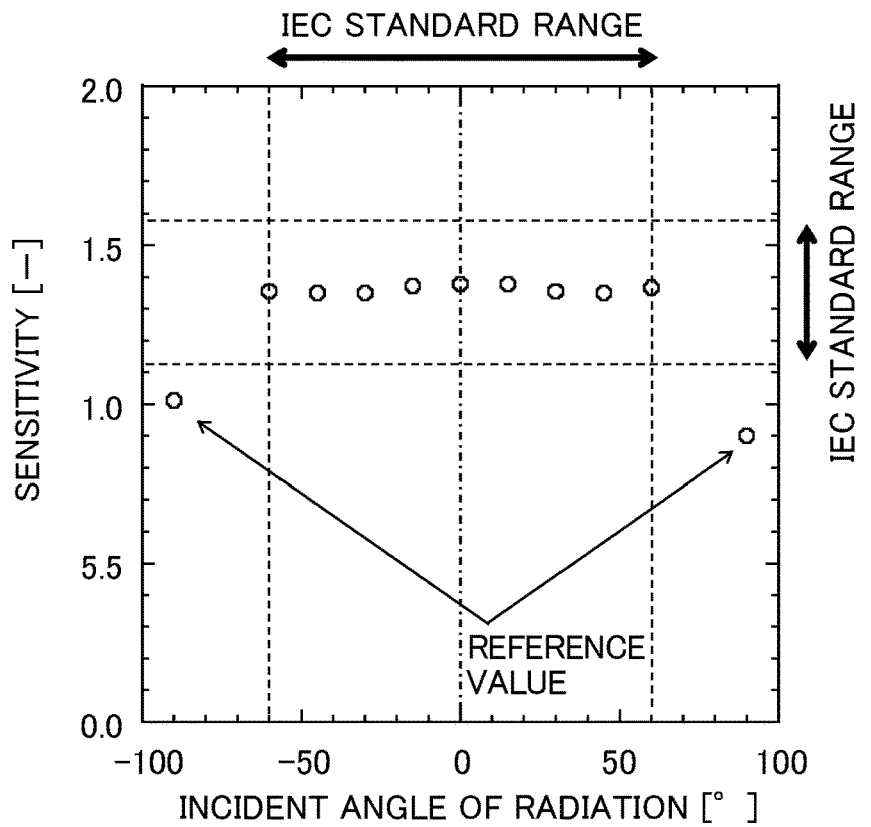
FIG. 7 is an experimental result illustrating incident angle characteristics of radiation in the radiation monitor according to the first embodiment of the present invention.

FIG. 7 is an experimental result illustrating incident angle characteristics of radiation in the radiation monitor 100.

Incidentally, the horizontal axis in FIG. 7 represents the incident angle of radiation (gamma rays), and the vertical axis represents the sensitivity to the radiation. As described above, when the incident angle θ of radiation is in the range of $-60° \leq θ \leq +60°$, one of the radiation detection units 11 and 12 does not become a hindrance against the other (see FIG. 3). Therefore, the sensitivity within the IEC standard range can be obtained regardless of the magnitude of the incident angle within the range of $-60° \leq θ \leq +60°$ conforming to the IEC standard.

Note that one of the radiation detection units 11 and 12 becomes the hindrance against the other when the irradiation angle is ±90°, and thus, the sensitivity to radiation is low (two "reference values" illustrated in FIG. 7). However, the incident angle of radiation is outside the IEC standard range in any case of ±90°, and thus, there is no particular problem even if the sensitivity is low.

Effect

According to the first embodiment, the radiation can be appropriately measured regardless of the energy of the radiation or the magnitude of the irradiation angle with the simple configuration where the two radiation detection elements 11a and 12a are optically connected in series. That is, the radiation monitor 100 having the sensitivity characteristics (energy-sensitivity characteristics or incident angle-sensitivity characteristics) within the IEC standard range can be provided by appropriately selecting the material and thickness of the housings 11b and 12b.

Further, the "optical transmission lines" that cause the light generated by the radiation detection elements 11a and 12a to merge and be guided to the light detection unit 14 are formed in common as the optical fiber 13q. Therefore, the total length of the "optical transmission line" is reduced as compared with a configuration (not illustrated) in which light generated by the radiation detection elements 11a and 12a are separately guided to the light detection unit 14, and thus, cost can be reduced.

Incidentally, the arrangement of the radiation detection units 11 and 12 is not limited to the example illustrated in FIG. 1. For example, the radiation detection units 11 and 12 may be arranged as follows.

Modification 1 of First Embodiment

Figure 8:
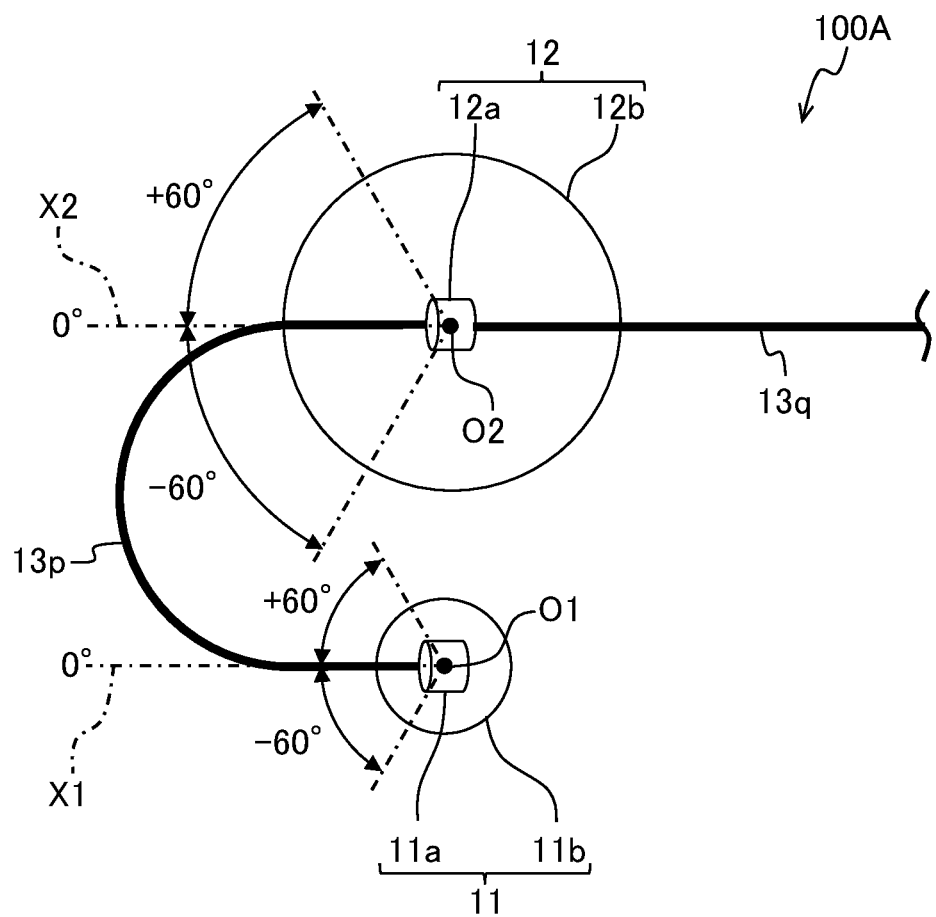
FIG. 8 is an explanatory view illustrating an arrangement of each radiation detection unit of a radiation monitor according to Modification 1 of the first embodiment of the present invention.

FIG. 8 is an explanatory view illustrating an arrangement of the radiation detection units 11 and 12 of a radiation monitor 100A according to Modification 1 of the first embodiment.

In the example illustrated in FIG. 8, the optical fiber 13p connecting the radiation detection elements 11a and 12a is bent in a U-shape. Further, a line segment passing through the center (center of gravity) of the radiation detection element 11a and overlapping with the central axis of the radiation detection element 11a is defined as a reference line X1 of an incident angle of radiation. The same applies to a reference line X2 for the radiation detection unit 12.

As illustrated in FIG. 8, when the incident angle θ of radiation is in the range of −60°≤θ≤+60° in one radiation detection unit 11, one of the radiation detection units 11 and 12 does not become a hindrance against the other. As a result, the radiation can be measured at a sensitivity conforming to the IEC standard at least within the range of −60°≤θ≤+60° regardless of the magnitude of the incident angle θ. Further, the radiation detection units 11 and 12 can be appropriately arranged in accordance with an installation space (for example, a narrow portion) of the radiation monitor 100 by bending the optical fiber 13p into the U-shape.

Modification 2 of First Embodiment

Figure 9:
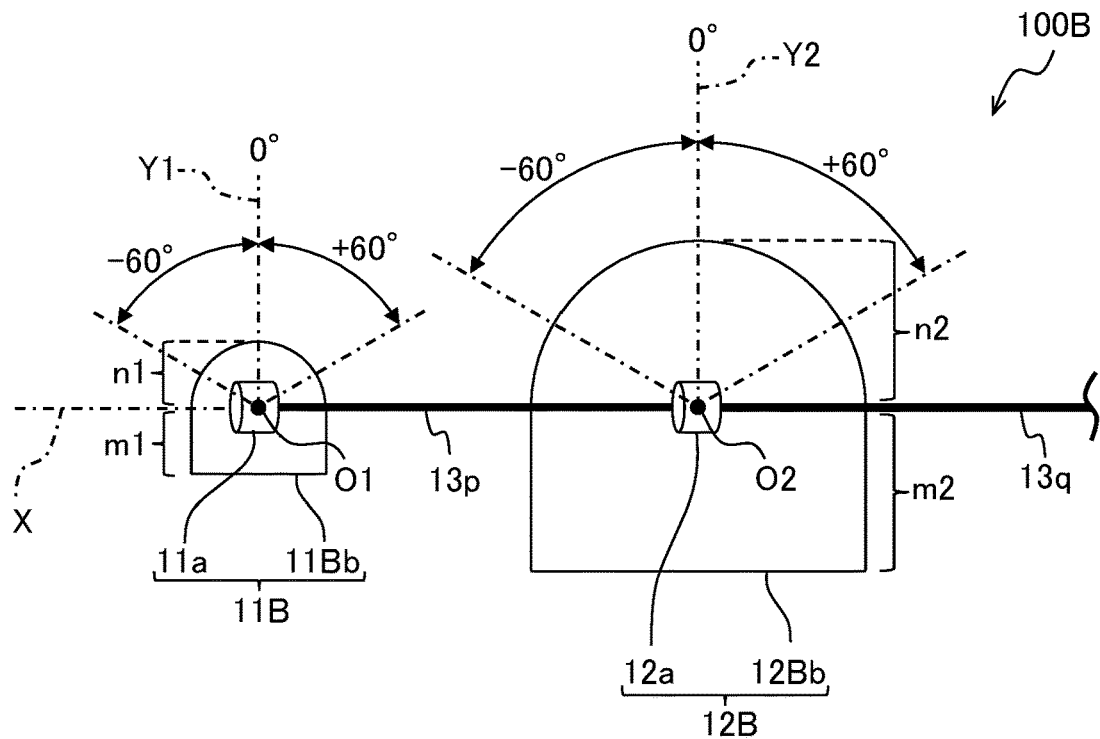
FIG. 9 is an explanatory view of the vicinity of each radiation detection unit in a radiation monitor according to Modification 2 of the first embodiment of the present invention.

FIG. 9 is an explanatory view of the vicinity of radiation detection units 11B and 12B of a radiation monitor 100B according to Modification 2 of the first embodiment.

As illustrated in FIG. 9, the radiation detection unit 11B includes the radiation detection element 11a and a housing 11Bb. The housing 11Bb has a configuration (dome shape) in which a columnar portion m1 having a columnar external shape and a hemispherical portion n1 having a hemispherical external shape are integrally molded. Incidentally, other shapes (for example, a part of an elliptical sphere) may be adopted as long as the surface of the hemispherical portion n1 is a curved surface that is convex upward.

The hemispherical portion n1 is provided on one side in the central axis direction (direction of the reference line Y1) of the columnar portion m1. The radiation detection element 11a is arranged in the vicinity of the center O1 based on a curvature of a spherical surface of the hemispherical portion n1. Further, a center axis of the radiation detection element 11a having the columnar shape and a center axis of the columnar portion m1 of the housing 11Bb are perpendicular to each other in the example illustrated in FIG. 9. Incidentally, the same applies to the other radiation detection unit 12B.

In this manner, the housings 11Bb and 12Bb include the hemispherical portions (hemispherical portions n1 and n2) on the outer shapes, respectively. Further, the other housing 12Bb is not arranged within a predetermined angle range (−60°≤θ≤60°) from the reference line Y1 passing through the housing 11Bb. The above-described reference line Y1 is a predetermined line segment passing through the center O1, and is perpendicular to the center axis of the radiation detection element 11a having the columnar shape.

Similarly, the other housing 11Bb is not arranged within a predetermined angle range (−60°≤θ≤60°) from the reference line Y2 passing through the housing 12Bb. As a result, it is possible to prevent one of the radiation detection units 11B and 12B from being a hindrance against the other and to reduce an error accompanying radiation detection.

Incidentally, a gap may be provided between the radiation detection element 11a and the housing 11Bb, or a gap may not be necessarily provided. In any case, the radiation detection element 11a can be firmly fixed to the thick columnar portion m1 (the same applies to the other radiation detection unit 12B).

Note that the matter that the housings 11b and 12b (see FIG. 1) respectively include the "hemispherical portions on the outer shapes" also applies to the radiation monitor 100 (see FIG. 1) described in the first embodiment.

Modification 3 of First Embodiment

Figure 10:
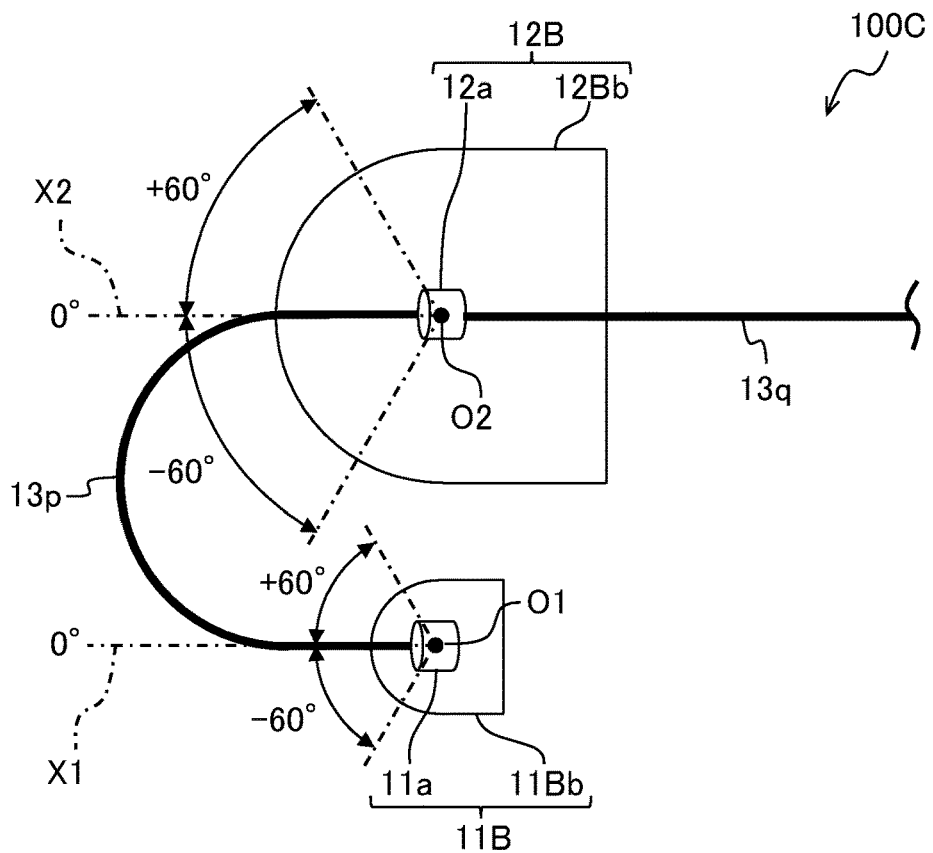
FIG. 10 is an explanatory view illustrating an arrangement of each radiation detection unit of a radiation monitor according to Modification 3 of the first embodiment of the present invention.

FIG. 10 is an explanatory view illustrating an arrangement of the radiation detection units 11B and 12B of a radiation monitor 100C according to Modification 3 of the first embodiment.

As illustrated in FIG. 10, the radiation detection units 11B and 12B may be connected to each other through the optical fiber 13p bent in a U-shape. That is, the configuration illustrated in FIG. 10 may be obtained by combining the above-described Modifications 1 and 2. As a result, the radiation detection units 11B and 12B can be appropriately arranged so as to firmly fix the radiation detection elements 11a and 12a, respectively, and to fit in the installation space.

Second Embodiment

A second embodiment is different from the first embodiment in that the radiation detection units 11 and 12 (see FIG. 11) are housed in one sealed container 17 (see FIG. 11), but is otherwise the same as the first embodiment. Therefore, only portions different from those of the first embodiment will be described, and overlapping portions will not be described.

Figure 11:
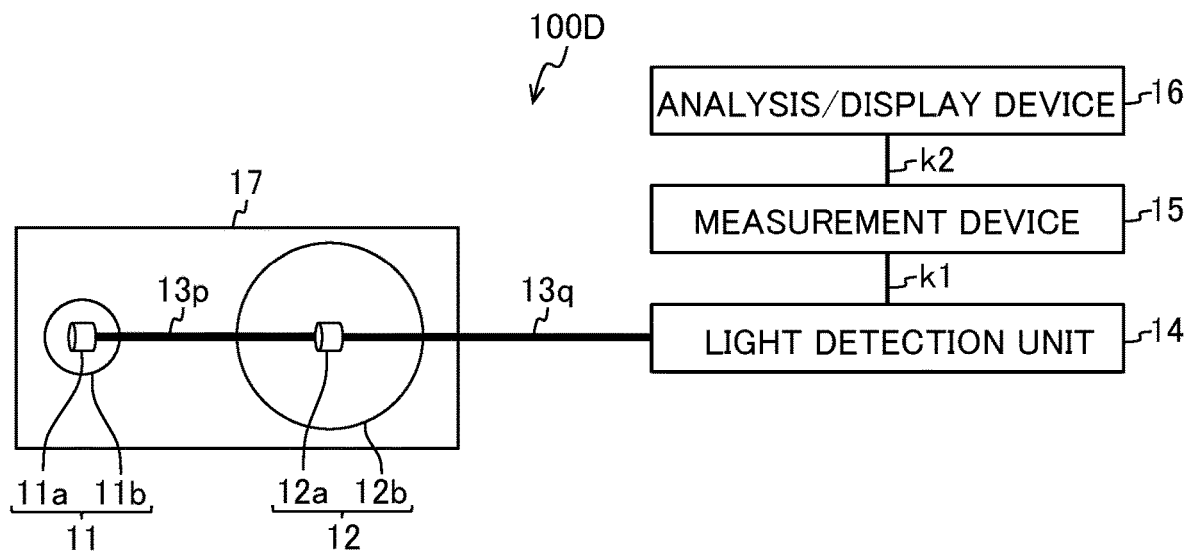
FIG. 11 is a configuration diagram of a radiation monitor according to a second embodiment of the present invention.

FIG. 11 is a configuration diagram of a radiation monitor 100D according to the second embodiment.

The radiation monitor 100D includes a sealed container 17 in addition to the same configurations as those in the first embodiment (see FIG. 1). The sealed container 17 houses the radiation detection units 11 and 12, and has a shell shape. As such a sealed container 17, a case made of metal or ceramics can be used. Incidentally, it is desirable for the sealed container 17 to have a thickness that does not impair the energy characteristics (see FIG. 6) and the incident angle characteristics (see FIG. 7) of the radiation detection units 11 and 12.

Since the radiation detection units 11 and 12 are housed in such a sealed container 17, for example, it is possible to suppress the entry of water vapor into the radiation detection units 11 and 12 even under a high-humidity environment. Incidentally, in the optical fiber 13$q$, a range from the sealed container 17 to the light detection unit 14 may be covered with a metallic flexible tube (not illustrated), and one end of the flexible tube may be fastened to a wall of the sealed container 17. As a result, it is possible to further suppress the entry of water vapor or the like into the sealed container 17.

Effect

According to the second embodiment, the radiation detection units 11 and 12 are housed in the single sealed container 17. As a result, the entry of water vapor or the like into the radiation detection units 11 and 12 can be suppressed even under the high-humidity environment. Therefore, it is possible to prevent the water vapor from adhering to inner wall surfaces of the housings 11$b$ and 12$b$ and the radiation detection elements 11$a$ and 12$a$, so that the radiation detection units 11 and 12 are less likely to break down.

Third Embodiment

A third embodiment is different from the first embodiment in that the optical fiber 13$q$ connecting the radiation detection element 12$a$ (see FIG. 12) and the light detection unit 14 can be divided into two parts by an optical connector 18. Incidentally, the other configurations are the same as those in the first embodiment. Therefore, only portions different from those of the first embodiment will be described, and overlapping portions will not be described.

Figure 12:
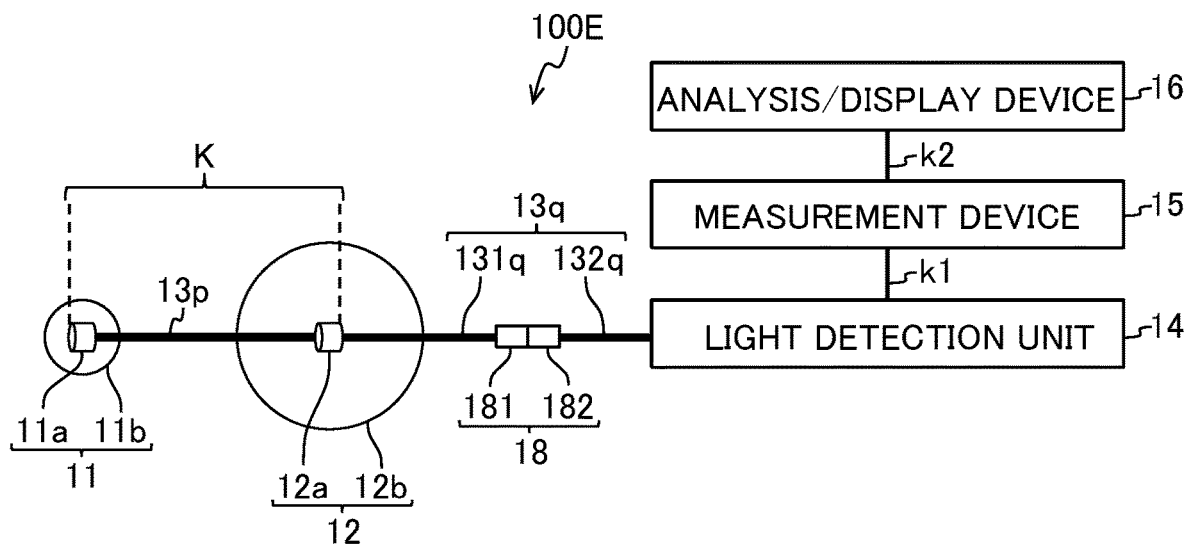
FIG. 12 is a configuration diagram of a radiation monitor according to a third embodiment of the present invention.

FIG. 12 is a configuration diagram of a radiation monitor 100E according to the third embodiment.

The radiation monitor 100E illustrated in FIG. 12 includes an optical connector 18 in addition to the same configurations as those of the first embodiment (see FIG. 1). The optical connector 18 allows the optical fiber 13$q$ to be divided into two optical fibers 131$q$ and 132$q$.

The optical connector 18 is provided at a portion (the optical fiber 13$q$), which connects the light detection unit 14 and a serially connected body K to which the radiation detection elements 11$a$ and 12$a$ are directly connected, in the above-described "optical transmission lines" (13$p$ and 13$q$). The optical connector 18 includes a plug 181 and a receptor 182 corresponding to the plug 181.

In the example illustrated in FIG. 12, the plug 181 is provided at the other end of the optical fiber 131$q$ whose one end is connected to the radiation detection element 12$a$. Further, the receptor 182 is provided at the other end of the optical fiber 132$q$ whose one end is connected to the light detection unit 14. When the radiation monitor 100E is used, the plug 181 and the receptor 182 are connected. Further, the plug 181 is removed from the receptor 182 when a failure occurs in the radiation detection elements 11$a$ and 12$a$ or the like. Then, the plug 181 and the receptor 182 are connected again after the above-described problem is solved.

Incidentally, a plurality of connectors 18 may be provided in the optical fiber 13$q$ or the like.

Effect

According to the third embodiment, when a failure occurs in the radiation detection elements 11$a$ and 12$a$ or the like, a point where the failure has occurred can be easily separated from the optical fiber 132$q$. Incidentally, a distance from installation sites of the radiation detection units 11 and 12 to a control room (an installation site of the light detection unit 14 and the like) is often several hundred meters. That is, a length of the optical fiber 132$q$ is sometimes several hundred meters.

In the present embodiment, the optical fiber 131$q$ having a relatively short length and the optical fiber 132$q$ having a relatively long length are connected through the optical connector 18. As a result, even if a failure occurs in the radiation detection elements 11$a$ and 12$a$ or the like, the replacement can be easily performed.

Fourth Embodiment

A fourth embodiment is different from the first embodiment in that a radiation monitor 100F (see FIG. 13) includes a light emitting unit 21, a light emitting unit control device 22, an optical branching unit 23, a wavelength selection unit 24, and the like. Further, a difference from the first embodiment is that an analysis/display device 16F (see FIG. 13) diagnoses whether the radiation detection elements 11$a$ and 12$a$ and the like deteriorate. Incidentally, the other configurations are the same as those in the first embodiment. Therefore, only portions different from those of the first embodiment will be described, and overlapping portions will not be described.

Figure 13:
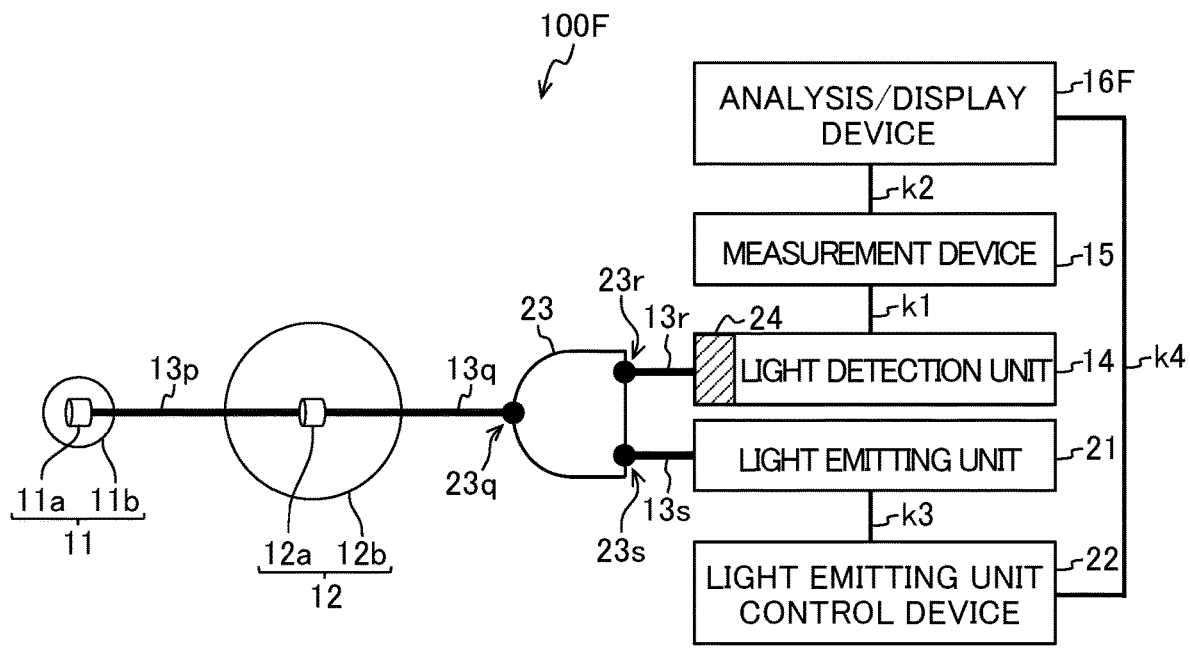
FIG. 13 is a configuration diagram of a radiation monitor according to a fourth embodiment of the present invention.

FIG. 13 is a configuration diagram of the radiation monitor 100F according to the fourth embodiment.

The radiation monitor 100F illustrated in FIG. 13 has a function of determining its own soundness (that is, whether the radiation monitor 100F is functioning normally) in addition to a function of measuring a dose rate of radiation. As illustrated in FIG. 13, the radiation monitor 100F includes the analysis/display device 16F and the like as well as the light emitting unit 21, optical fibers 13$p$, 13$q$, 13$r$, and 13$s$, the light emitting unit control device 22, the optical branching unit 23, and the wavelength selection unit 24.

The radiation detection elements 11$a$ and 12$a$ illustrated in FIG. 13 are elements that have sensitivity to radiation and also have sensitivity to light, and emit light at a predetermined emission wavelength with incidence of radiation or light. As such radiation detection elements 11$a$ and 12$a$, for example, a scintillation element containing a rare earth element in yttrium aluminum garnet can be used.

The light emitting unit 21 illustrated in FIG. 13 is a semiconductor laser used at the time of determining whether the radiation monitor 100F is functioning normally. Incidentally, a light emitting diode (LED) may be used as the light emitting unit 21. The light emitting unit 21 emits light having a wavelength different from the emission wavelength of the radiation detection elements 11$a$ and 12$a$.

Figure 14:
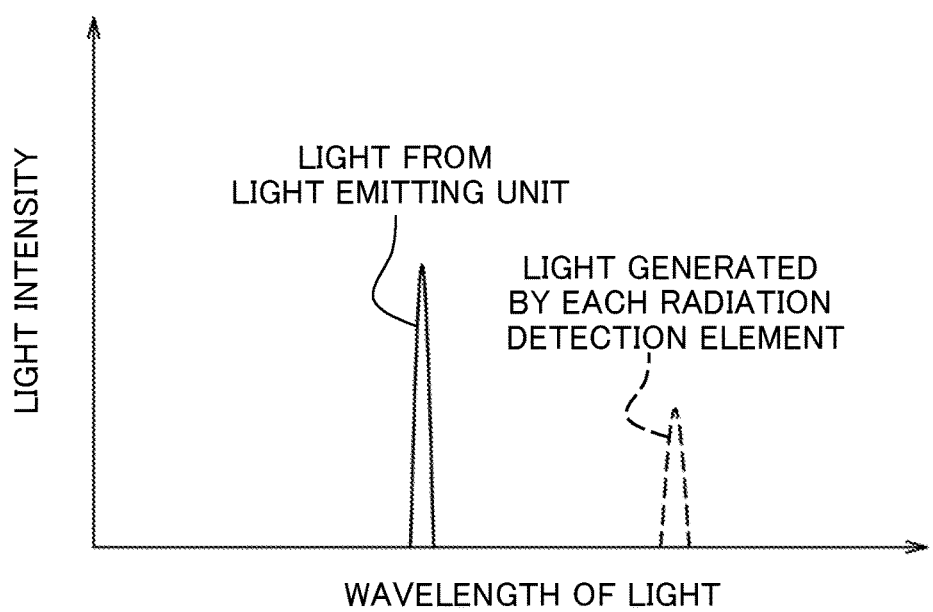
FIG. 14 is an explanatory view relating to light generated by each radiation detection element and light from a light emitting unit in the radiation monitor according to the fourth embodiment of the present invention.

FIG. 14 is an explanatory view relating to light generated by the radiation detection elements 11$a$ and 12$a$ and light from the light emitting unit 21. Incidentally, the horizontal axis of FIG. 14 represents the wavelength of light, and the vertical axis represents the light intensity.

In the example illustrated in FIG. 14, the wavelength of the light from the light emitting unit 21 is shorter than the wavelength (that is, the emission wavelength) of the light generated by the radiation detection elements 11a and 12a. As a result, the light generated by the radiation detection elements 11a and 12a and the light emitted from the light emitting unit 21 can be distinguished (one is transmitted and the other is blocked) in the wavelength selection unit 24. Incidentally, the present embodiment can be applied to even a case where the wavelength of light from the light emitting unit 21 is longer than the emission wavelength of the radiation detection elements 11a and 12a.

The inventors have found that there is a proportional relationship between the light intensity of the light emitting unit 21 and the number (total number) of photons generated by the radiation detection elements 11a and 12a per unit time through experiments. In the present embodiment, the relationship between the light intensity of the light emitting unit 21 and the count rate of the electric pulses in the light detection unit 14 is specified based on such a proportional relationship.

The light emitting unit control device 22 illustrated in FIG. 13 is a device that controls the light emitting unit 21, and is connected to the light emitting unit 21 through a wiring k3. Incidentally, the processing executed by the light emitting unit control device 22 will be described later.

The optical branching unit 23 causes the light from the radiation detection elements 11a and 12a to branch toward the light emitting unit 21 and the wavelength selection unit 24. That is, the optical branching unit 23 has a function of guiding light, incident on a first port 23q through the optical fiber 13q, to the optical fiber 13r through a second port 23r and to the optical fiber 13s through a third port 23s.

Further, the optical branching unit 23 also has a function of guiding light, incident from the light emitting unit 21 through the optical fiber 13s, to the radiation detection units 11 and 12 through the optical fiber 13q and the like. For example, an optical coupler can be used as such an optical branching unit 23.

Incidentally, an "optical transmission line" that transmits light from the light emitting unit 21 to the radiation detection elements 11a and 12a and transmits light from the radiation detection elements 11a and 12a to the light detection unit 14 includes the optical fibers 13p, 13q, 13r, and 13s and the optical branching unit 23.

The light, incident on the optical branching unit 23 from the radiation detection units 11 and 12 through the optical fiber 13q and the like, is split and transmitted to the optical fibers 13r and 13s at a ratio of 1:1. Among them, detection of radiation, an inspection of the radiation monitor 100F, and the like are performed based on the light transmitted through the optical fiber 13r.

The wavelength selection unit 24 selectively transmits light having a wavelength within a predetermined range. As such a wavelength selection unit 24, for example, a wavelength selection filter or a spectroscope can be used.

The wavelength selection unit 24 can be switched from one of a "first mode" and a "second mode", which will be described below, to the other.

The "first mode" is a mode in which light having the emission wavelength (for example, 1064 nm) of the radiation detection elements 11a and 12a is transmitted and the light from the light emitting unit 21 is blocked.

The "second mode" is a mode in which the light from the light emitting unit 21 is transmitted and the light having the emission wavelength of the radiation detection elements 11a and 12a is blocked.

For example, in a configuration where the wavelength selection unit 24 includes a plurality of wavelength selection filters, the wavelength selection filters corresponding to the above-described respective modes are selected by an autochanger system. Further, when the wavelength selection unit 24 is a spectroscope, an angle of the spectroscope is adjusted so as to correspond to each of the above-described modes.

The light detection unit 14 converts the light that has been transmitted through the wavelength selection unit 24 into an electric pulse.

The measurement device 15 measures a count rate of the electric pulses input from the light detection unit 14.

The analysis/display device 16F calculates a dose rate of radiation based on the above-described count rate and the light intensity of the light emitting unit 21, and determines whether the light emitting unit 21 deteriorates.

Figure 15:
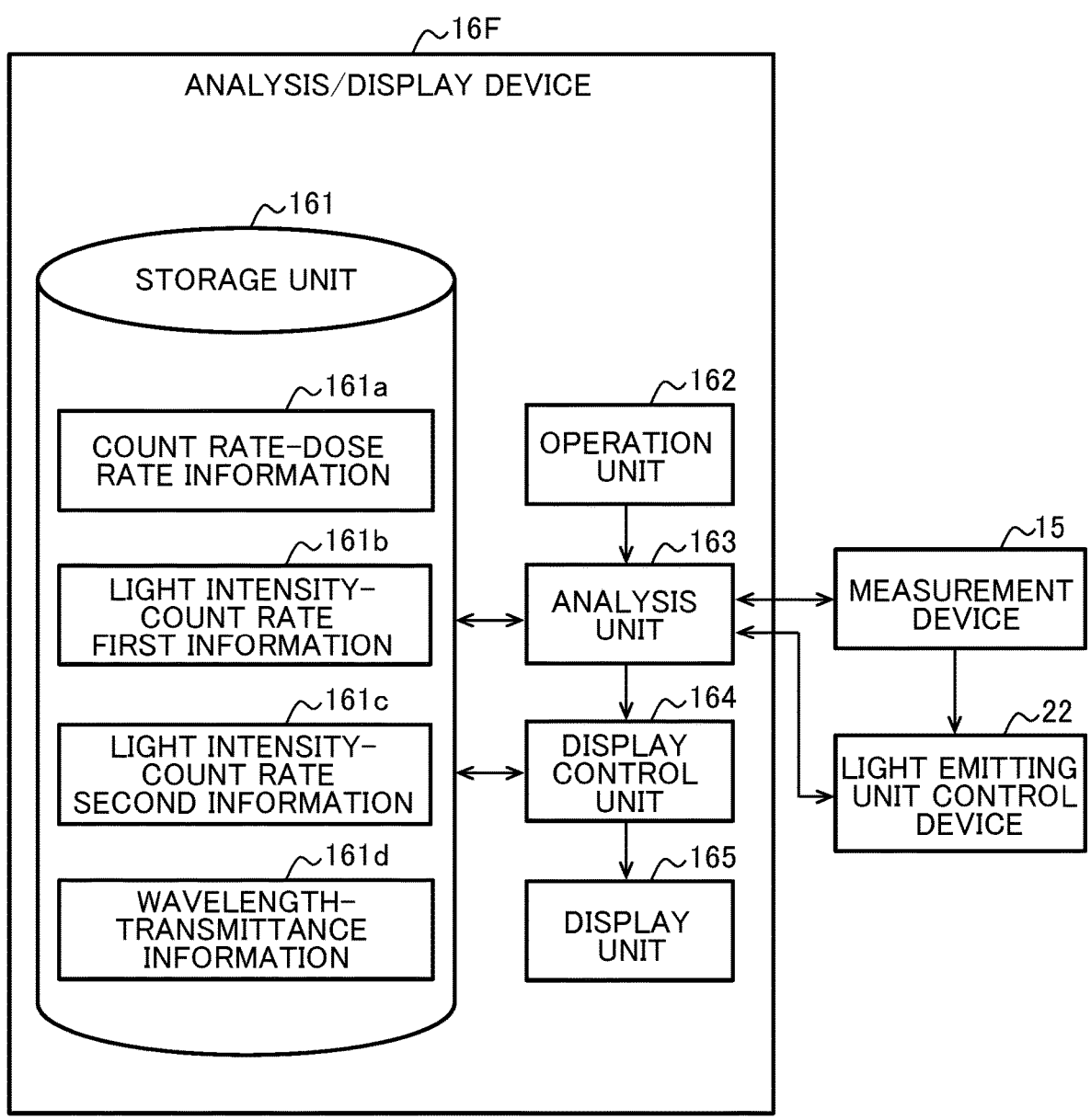
FIG. 15 is a functional block diagram of an analysis/display device provided in the radiation monitor according to the fourth embodiment of the present invention.

FIG. 15 is a functional block diagram of the analysis/display device 16F included in the radiation monitor 100F. As illustrated in FIG. 15, the analysis/display device 16F includes a storage unit 161, an operation unit 162, an analysis unit 163, a display control unit 164, and a display unit 165.

In the storage unit 161, count rate-dose rate information 161a, light intensity-count rate first information 161b, light intensity-count rate second information 161c, and wavelength-transmittance information 161d are stored in advance.

The count rate-dose rate information 161a is information indicating a relationship between the count rate of the electric pulses input from the measurement device 15 (that is, the count rate of photons) and the dose rate of radiation. As described above, the count rate and the dose rate are in the proportional relationship.

Incidentally, the light intensity-count rate first information 161b, the light intensity-count rate second information 161c, and the wavelength-transmittance information 161d illustrated in FIG. 15 will be described later.

The operation unit 162 illustrated in FIG. 15 is configured to receive user's operation relating to an inspection on whether the radiation monitor 100F (see FIG. 13) is functioning normally, measurement of radiation, and the like.

The analysis unit 163 calculates the dose rate of radiation based on the count rate input from the measurement device 15 and the count rate-dose rate information 161a. Further, the analysis unit 163 determines whether the light emitting unit 21 or the like deteriorates based on the count rate input from the measurement device 15 and the light intensity of the light emitting unit 21 input from the light emitting unit control device 22. Incidentally, the processing executed by the analysis unit 163 will be described later.

The display control unit 164 causes the display unit 165 to display an analysis result and the like of the analysis unit 163.

The display unit 165 is a display that displays the analysis result and the like of the analysis unit 163.

Processing of Radiation Monitor

1. During Radiation Measurement

The measurement device 15 sets the wavelength selection unit 24 illustrated in FIG. 13 to the first mode described above at the time of performing the measurement of radiation. That is, the measurement device 15 sets the wavelength selection unit 24 so as to transmit the light having the emission wavelength of the radiation detection elements 11a and 12a and block the light from the light emitting unit 21.

Photons generated by the radiation detection elements 11a and 12a with the incidence of the radiation enter the optical branching unit 23 through the optical fiber 13q and the like. Then, half of the above-described photons enter the wavelength selection unit 24 through the optical fiber 13r, and further pass through the wavelength selection unit 24. A dose rate of radiation is calculated based on the number of the photons per unit time (count rate). Incidentally, there is no particular need to cause the light emitting unit 21 to emit light, except during the inspection to be described below.

2. During Inspection of Radiation Monitor

The "Inspection" of the radiation monitor 100F is performed in a state where the dose rate of radiation incident on the radiation detection elements 11a and 12a is at a background level (natural radiation level). Such an "inspection" is often performed periodically in a state where devices (radiation generating sources) around the radiation monitor 100F are stopped. Incidentally, the radiation at the "background level" is weak radiation caused by cosmic rays or underground natural radioactive materials.

Figure 16:
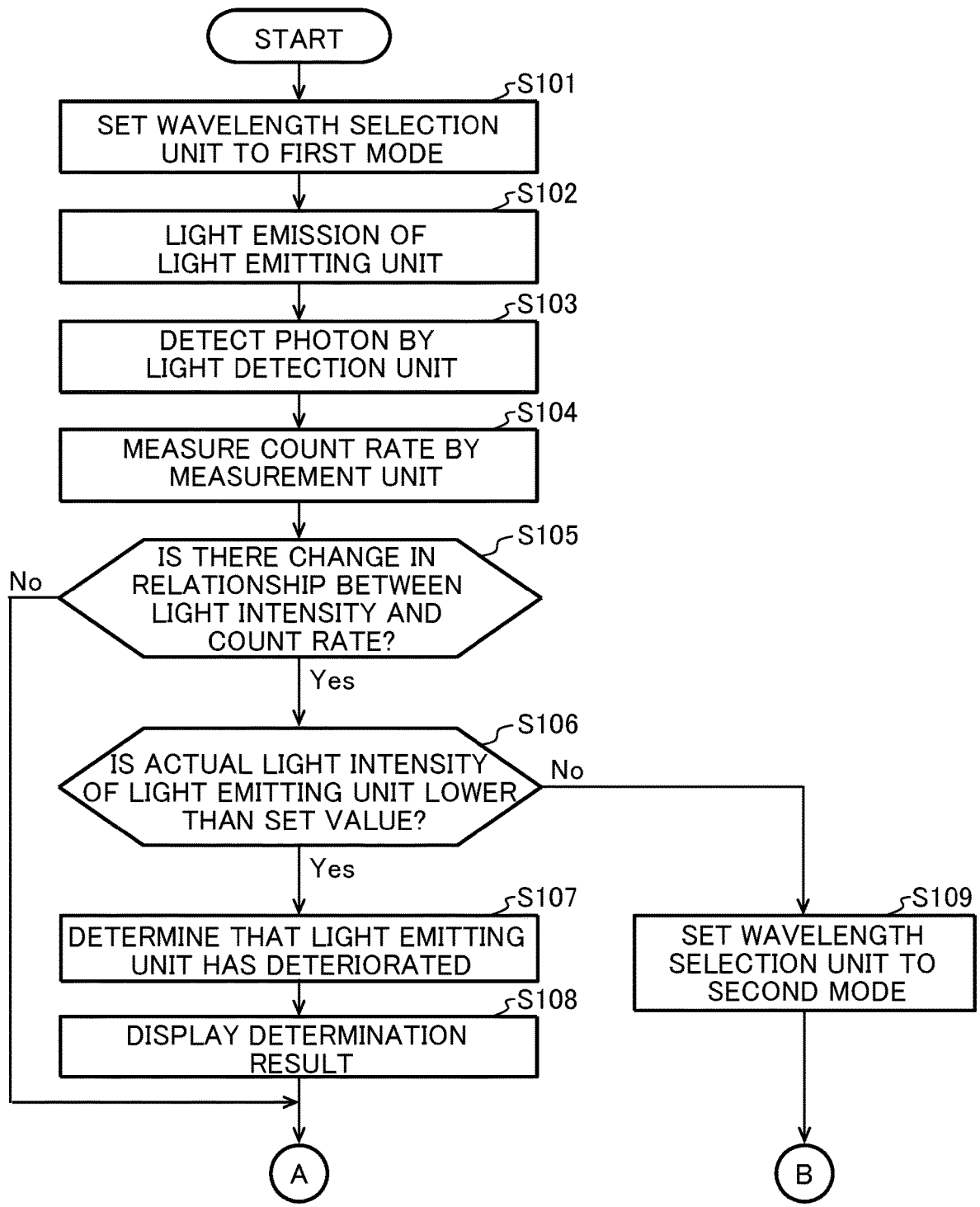
FIG. 16 is a flowchart of processing during an inspection of the radiation monitor according to the fourth embodiment of the present invention.

FIG. 16 is a flowchart of processing during the inspection of the radiation monitor 100F (see FIG. 13 as appropriate).

In Step S101, the radiation monitor 100F sets the wavelength selection unit 24 to the "first mode" using the measurement device 15. That is, the radiation monitor 100F sets the wavelength selection unit 24 so as to transmit the light having the emission wavelength of the radiation detection elements 11a and 12a and block the light from the light emitting unit 21.

In Step S102, the radiation monitor 100F causes the light emitting unit 21 to emit light. That is, the radiation monitor 100F uses the light emitting unit control device 22 to control the light emitting unit 21 to emit light at a wavelength different from the emission wavelength of the radiation detection element 11a based on a predetermined light intensity setting value.

The light emitted from the light emitting unit 21 enters the radiation detection element 11a through the optical fiber 13q and the like. Due to the energy of this light, a photon with a predetermined emission wavelength (for example, 1064 nm) is generated in the radiation detection element 11a at a generation rate proportional to the intensity of the emitted light. This photon enters the wavelength selection unit 24 through the optical fiber 13r and the like, and passes through the wavelength selection unit 24.

Further, light transmitted from the light emitting unit 21 and reflected and scattered in the radiation detection units 11 and 12 also enters the wavelength selection unit 24 through the optical fiber 13r and the like. Here, the direct light from the light emitting unit 21 is blocked by the wavelength selection unit 24 since the wavelength selection unit 24 is set to the "first mode".

In Step S103 in FIG. 16, the radiation monitor 100F detects photons using the light detection unit 14. As described above, each photon incident on the light detection unit 14 is photoelectrically converted as each electric pulse.

In Step S104, the radiation monitor 100F measures a count rate using the measurement device 15. That is, the radiation monitor 100F uses the measurement device 15 to count the number of electric pulses per unit time. This value is not only the count rate of electric pulses but also the count rate of photons transmitted through the wavelength selection unit 24. The count rate and the light intensity of the light emitting unit 21 are in a proportional relationship.

Figure 18:
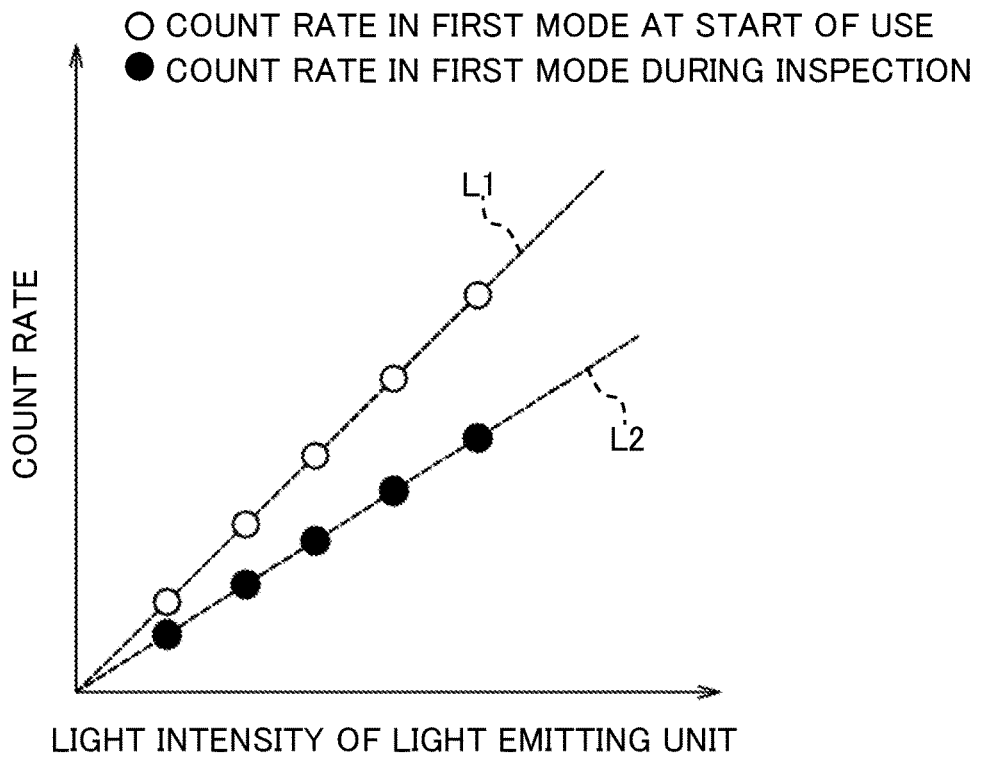
FIG. 18 is an explanatory view illustrating a relationship in a first mode between a light intensity of a light emitting unit and a count rate in the radiation monitor according to the fourth embodiment of the present invention.

FIG. 18 is an explanatory view illustrating the relationship between the light intensity of the light emitting unit 21 and the count rate in the first mode.

Incidentally, the horizontal axis in FIG. 18 represents the light intensity of the light emitting unit 21, and the vertical axis represents the count rate measured by the measurement device 15. A plurality of marks o illustrated in FIG. 18 indicate data obtained when it is known that the radiation monitor 100F is normal in a state where the wavelength selection unit 24 is set to the first mode. A proportional coefficient of a straight line L1 passing through these marks ○ is stored in the storage unit 161 in advance as the light intensity-count rate first information 161b (see FIG. 15) indicating the relationship between the light intensity of the light emitting unit 21 and the count rate. Incidentally, a plurality of marks ● illustrated in FIG. 18 will be described later.

In Step S105 of FIG. 16, the radiation monitor 100F uses the analysis/display device 16F to determine whether the relationship between the light intensity and the count rate has changed. That is, in Step S105, the analysis/display device 16F determines whether the count rate caused by the light emitted from the light emitting unit 21 has decreased with the light intensity-count rate first information 161b (indicated by the mark ○ in FIG. 18) as a reference.

In the example illustrated in FIG. 18, a proportional coefficient of a straight line L2 passing through the plurality of marks ● is smaller than that of the reference straight line L1. That is, the count rate during the inspection (the mark ●) is lower than that at the start of use (the mark ○) for each light intensity. In such a case, the analysis/display device 16F determines that the relationship between the light intensity and the count rate has changed in Step S105 of FIG. 16.

Incidentally, three causes of the above-described change can be listed: deterioration of the light emitting unit 21, deterioration of the optical fiber 13q and the like, and deterioration of the radiation detection elements 11a and 12a. In the present embodiment, any one of the three causes is determined by processing in Steps S106 to S118 (see FIGS. 16 and 17).

When the relationship between the light intensity and the count rate has changed in Step S105 in FIG. 16 (S105: Yes), the processing of the radiation monitor 100F proceeds to Step S106.

In Step S106, the radiation monitor 100F uses the analysis/display device 16F to determine whether an actual light intensity of the light emitting unit 21 is lower than a predetermined set value. For example, an inspector may connect a light intensity measurement device (not illustrated) to the light emitting unit 21 such that a measurement value (actual light intensity of the light emitting unit 21) is output from the light intensity measurement device to the analysis/display device 16F.

If the actual light intensity of the light emitting unit 21 is lower than the set value in Step S106 (S106: Yes), the processing of the radiation monitor 100F proceeds to Step S107.

In Step S107, the radiation monitor 100F determines that the light emitting unit 21 has deteriorated, by the analysis/display device 16F. This is because the actual light intensity of the light emitting unit 21 is lower than the set value.

Figure 17:
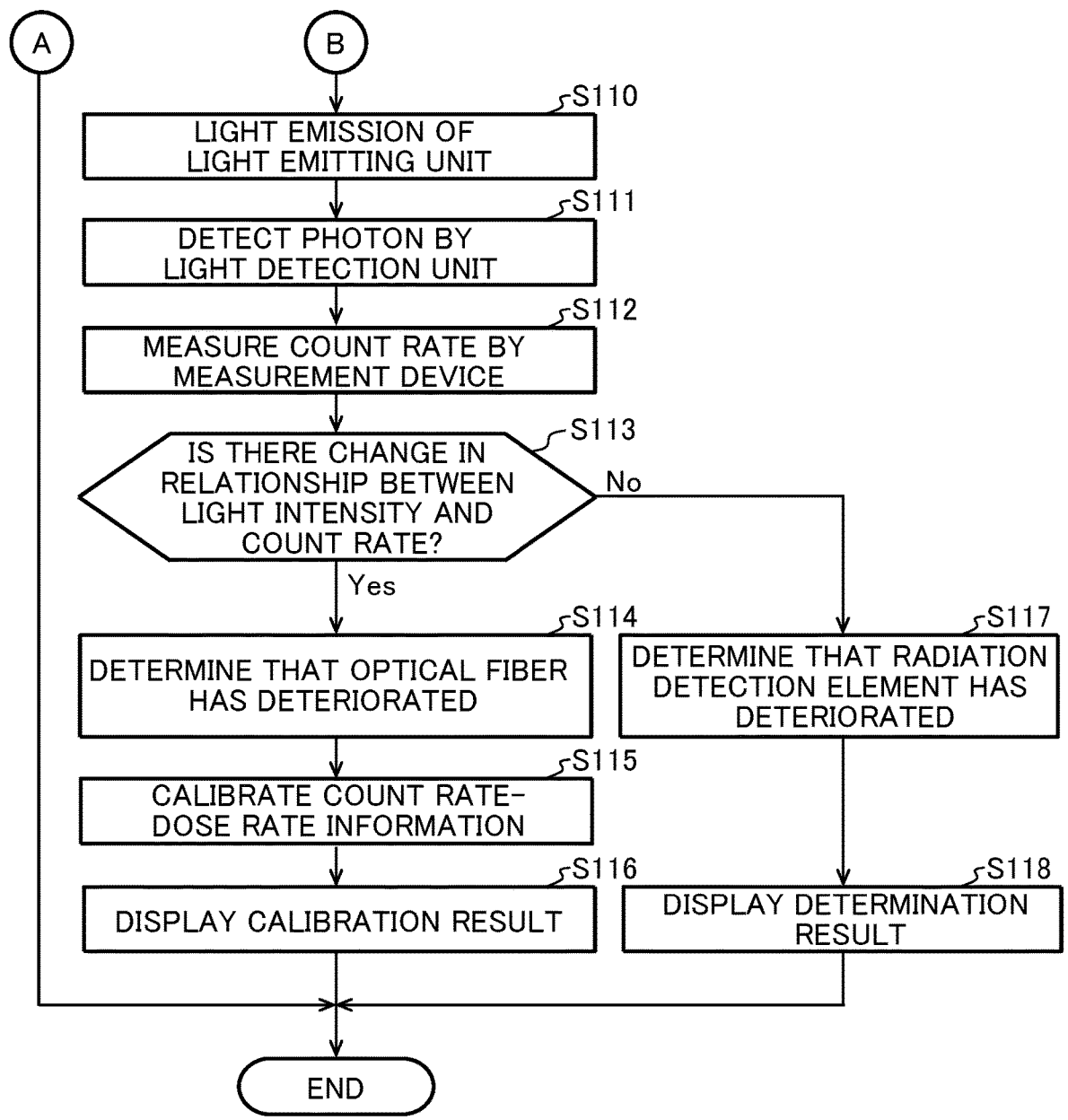
FIG. 17 is a flowchart of processing during the inspection of the radiation monitor according to the fourth embodiment of the present invention.

In Step S108, the radiation monitor 100F displays the fact that the light emitting unit 21 has deteriorated on the analysis/display device 16F, and ends the processing ("END" in FIG. 17). In this case, the light intensity of the light emitting unit 21 is newly adjusted using the light emitting unit control device 22, or the light emitting unit 21 is repaired or replaced.

In addition, if the actual light intensity of the light emitting unit 21 is not lower than the set value in Step S106 (S106: No), the processing of the radiation monitor 100F proceeds to Step S109. In this case, there is a high possibility that the optical fiber 13q or the like has deteriorated, or the radiation detection elements 11a and 12a have deteriorated.

In Step S109, the radiation monitor 100F sets the wavelength selection unit 24 to the "second mode" using the measurement device 15. That is, the radiation monitor 100F sets the wavelength selection unit 24 so as to transmit the light from the light emitting unit 21 and block the light having the emission wavelength of the radiation detection elements 11a and 12a.

In Step S110 of FIG. 17, the radiation monitor 100F causes the light emitting unit 21 to emit light. Photons generated by the radiation detection elements 11a and 12a due to the light from the light emitting unit 21 enter the wavelength selection unit 24 through the optical fiber 13r and the like. The photons are blocked by the wavelength selection unit 24 set to the second mode. On the other hand, the light, which has been emitted from the light emitting unit 21 and reflected and scattered in the radiation detection units 11 and 12, enters the wavelength selection unit 24 through the optical fiber 13r or the like, and passes through this wavelength selection unit 24.

In Step S111, the radiation monitor 100F detects photons using the light detection unit 14.

In Step S112, the radiation monitor 100F measures a count rate using the measurement device 15. This count rate is proportional to the light intensity of the light emitting unit 21 as described above.

Figure 19:
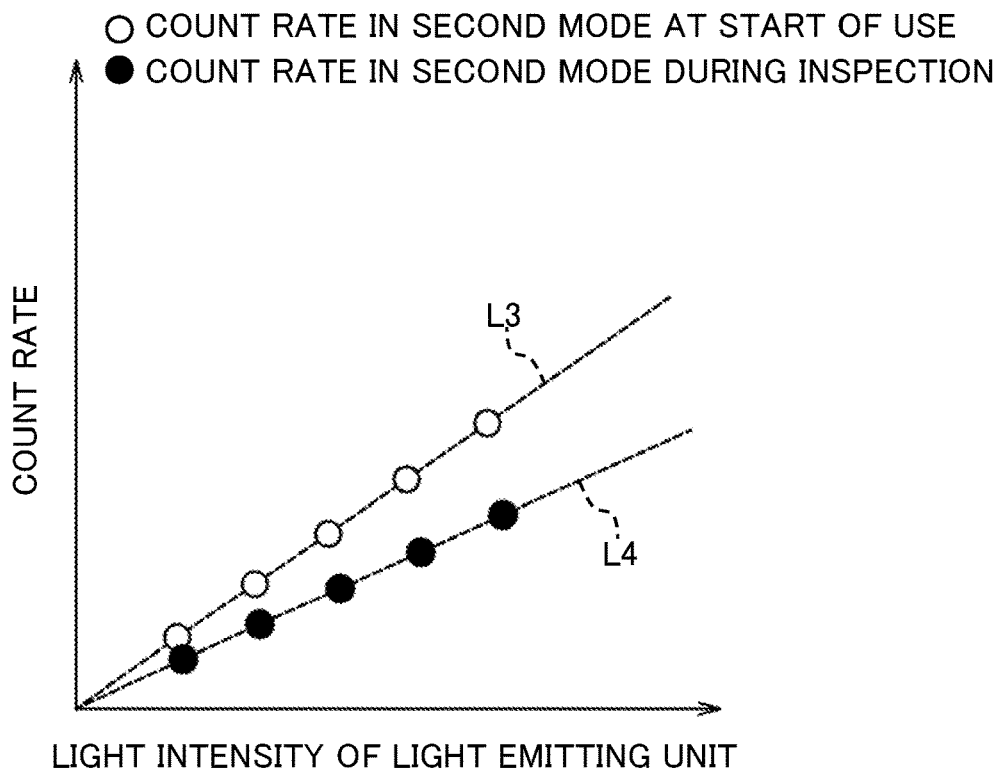
FIG. 19 is an explanatory view illustrating a relationship in a second mode between a light intensity of a light emitting unit and a count rate in the radiation monitor according to the fourth embodiment of the present invention.

FIG. 19 is an explanatory view illustrating the relationship between the light intensity of the light emitting unit 21, included in the radiation monitor 100F, and the count rate in the second mode.

The horizontal axis in FIG. 19 represents the light intensity of the light emitting unit 21, and the vertical axis represents the count rate measured by the measurement device 15. A plurality of marks ○ illustrated in FIG. 19 indicate data obtained when it is known that the radiation monitor 100F is normal in a state where the wavelength selection unit 24 is set to the second mode. A proportional coefficient of a straight line L3 passing through these marks ○ is stored in the storage unit 161 in advance as the light intensity-count rate second information 161c (see FIG. 15) indicating the relationship between the light intensity of the light emitting unit 21 and the count rate. Incidentally, a plurality of marks ● illustrated in FIG. 19 will be described later.

In Step S113 of FIG. 17, the radiation monitor 100F uses the analysis/display device 16F to determine whether the relationship between the light intensity and the count rate has changed. That is, in Step S113, the analysis/display device 16F determines whether the count rate caused by the light emitted from the light emitting unit 21 has decreased with the light intensity-count rate second information 161c (indicated by the mark ○ in FIG. 19) as a reference.

In the example illustrated in FIG. 19, a proportional coefficient of a straight line L4 passing through the plurality of marks ● is smaller than that of the reference straight line L3. That is, the count rate during the inspection (the mark ●) is lower than that at the start of use (the mark ○) for each light intensity. In such a case, the analysis/display device 16F determines that the relationship between the light intensity and the count rate has changed in Step S113 of FIG. 17 (S113: Yes), and proceeds to processing in Step S114.

In Step S114, the radiation monitor 100F determines that the optical fiber 13q and the like have deteriorated, by the analysis/display device 16F. This is because, if the optical fibers 13p and 13q deteriorate due to the influence of radiation, it becomes difficult for light to be transmitted, and the above-described count rate becomes lower than that in a normal state.

In Step S115, the radiation monitor 100F uses the analysis/display device 16F to calibrate the count rate-dose rate information 161a (see FIG. 15). This "calibration" will be described with reference to FIG. 20, taking an example in which the optical fiber 13q has deteriorated.

Figure 20:
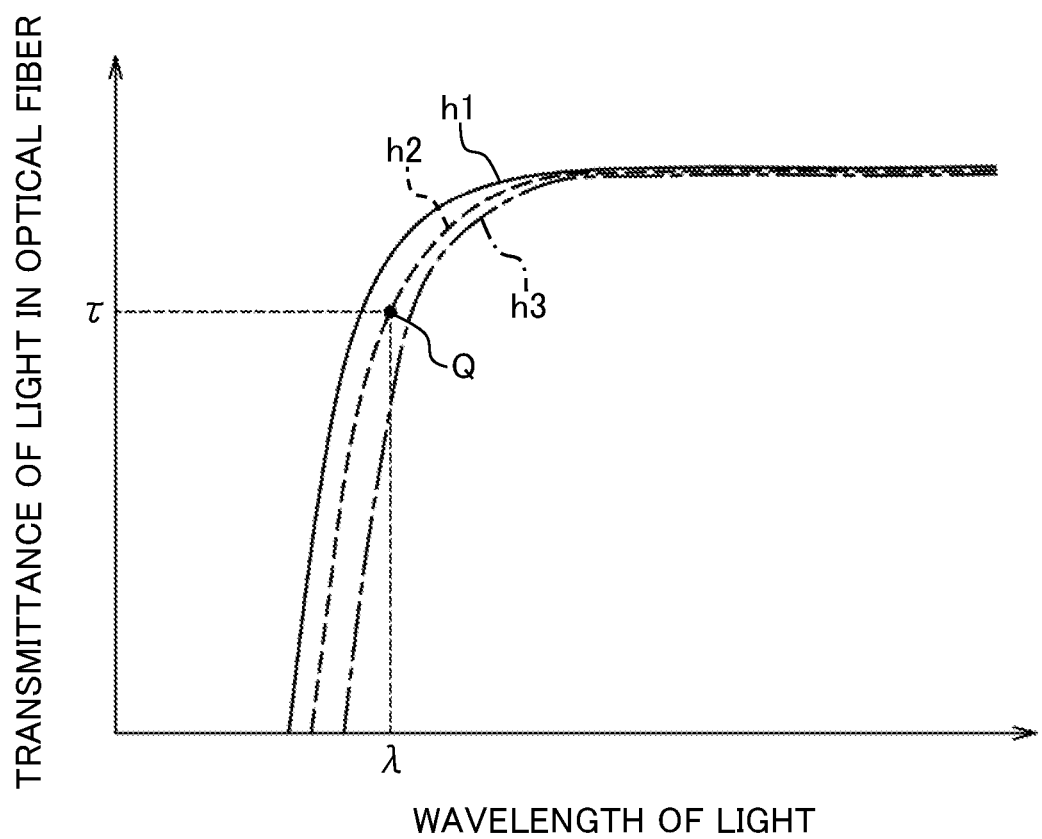
FIG. 20 is an explanatory view of wavelength-transmittance information stored in a storage unit of the radiation monitor according to the fourth embodiment of the present invention.

FIG. 20 is an explanatory view of the wavelength-transmittance information 161d stored in the storage unit 161 of the radiation monitor 100F.

The horizontal axis of FIG. 20 represents the wavelength of light transmitted through the optical fiber 13q. The vertical axis in FIG. 20 represents the transmittance of light of the optical fiber 13q. As illustrated in FIG. 20, the transmittance of light rapidly increases from a certain wavelength as the wavelength of light in the optical fiber 13q increases, and the transmittance of light converges to a predetermined value when the wavelength of light further increases.

Further, as compared with a state where the optical fiber 13q has not deteriorated (curve h1), the transmittance of light at each wavelength is low in a state where the optical fiber 13q has deteriorated (curve h2) and a state where the optical fiber 13q has further deteriorated (curve h3). In this manner, the relationship between the wavelength and the transmittance of light in the optical fiber 13q is associated with a predetermined numerical value indicating the degree of deterioration of the optical fiber 13q, which is stored in the storage unit 161 in advance as the wavelength-transmittance information 161d (see FIG. 15).

The procedure of the "calibration" in Step S115 in FIG. will be specifically described as follows. The analysis/display device 16F first reads the wavelength of light from the light emitting unit 21. This wavelength value is transmitted from the light emitting unit control device 22 to the analysis/display device 16F.

Next, the analysis/display device 16F calculates the transmittance of light of the optical fiber 13q. This transmittance is calculated based on the light intensity of the light emitting unit 21 and the count rate input from the measurement device 15. Then, the analysis/display device 16F calibrates the count rate-dose rate information 161a based on the wavelength of the light of the light emitting unit 21, the transmittance of the light in the optical fiber 13q, and the above-described wavelength-transmittance information 161d.

In the example illustrated in FIG. 20, when light having a wavelength A is emitted from the light emitting unit 21, the light is transmitted at a transmittance T through the optical fiber 13q. Therefore, the analysis/display device 16F reads, from the storage unit 161a, a predetermined numerical value φ (a numerical value indicating the degree of deterioration of the optical fiber 13q) associated with the curve h2 passing through a point Q ($\lambda$, $\tau$).

Then, the analysis/display device 16F multiplies the proportional coefficient of the dose rate relative to the count rate (proportional coefficient when the optical fiber 13q has not deteriorated) by the numerical value φ based on the count rate-dose rate information 161a (see FIG. 15), thereby calculating a new proportional coefficient. As a result, the dose rate of radiation can be calculated with high accuracy even if the optical fiber 13q deteriorates. Incidentally, the optical fiber 13q may be replaced if the optical fiber 13q has significantly deteriorated.

The description will be continued returning to FIG. 17 again.

In Step S116 of FIG. 17, the radiation monitor 100F causes the analysis/display device 16F to display a calibration result in Step S115, and ends the processing (END).

If there is no change in the relationship between the light intensity and the count rate in Step S113 (S113: No), the processing of the radiation monitor 100F proceeds to Step S117.

In Step S117, the radiation monitor 100F determines that the radiation detection elements 11a and 12a have deteriorated, by the analysis/display device 16F. That is, the analysis/display device 16F determines that at least one of the radiation detection elements 11a and 12a has deteriorated. This is because there is a high possibility that the radiation detection elements 11a and 12a, which are the remaining one among the three causes, deteriorate if neither the light emitting unit 21 nor the optical fiber 13q has deteriorated.

Incidentally, when the emission wavelengths of the radiation detection elements 11a and 12a are different from each other, the measurement device 15 may switch the wavelength selection unit 24 such that one of two wavelengths of light is transmitted and the other is blocked. In this case, the analysis/display device 16F identifies which of the radiation detection elements 11a and 12a has deteriorated based on the count rate measured by the measurement device 15 and the light intensity of the light emitting unit 21.

In Step S118, the radiation monitor 100F causes the analysis/display device 16F to display a determination result in Step S117, and ends the processing (END). In this case, at least one of the radiation detection elements 11a and 12a is replaced with a new one.

Effect

According to the fourth embodiment, the light emitting unit 21 emits light at the wavelength different from the emission wavelength of the radiation detection elements 11a and 12a during the inspection of the radiation monitor 100F. Then, which of the light emitting unit 21, the optical fiber 13q and the like, and the radiation detection elements 11a and 12a has deteriorated can be easily identified by appropriately switching the setting (the first mode or the second mode) of the wavelength selection unit 24.

Further, the inspector does not need to go to the vicinity of the radiation detection units 11 and 12 since the above-described inspection is performed by the analysis/display device 16F and the like. As a result, the inspection of the radiation monitor 100F can be easily performed, for example, even under a severe environment with a high dose rate.

Further, it is not necessary to apply a high voltage to the radiation detection units 11 and 12, and thus, there is no possibility that a hydrogen explosion or the like may occur even in a hydrogen/oxygen atmosphere environment, and no electrical noise occurs. In this manner, the highly reliable radiation monitor 100F can be provided according to the fourth embodiment.

Figure 21:
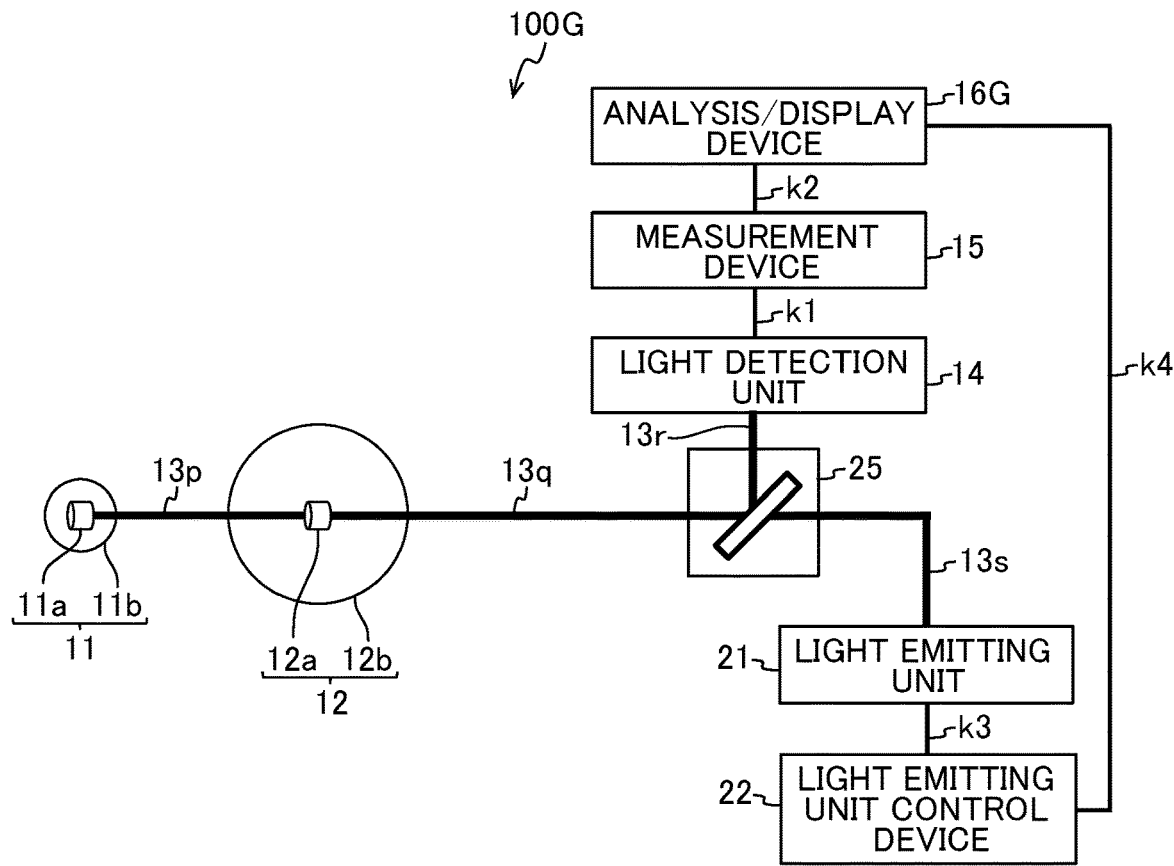
FIG. 21 is a configuration diagram of a radiation monitor according to a modification of the fourth embodiment of the present invention.

Incidentally, a mirror 25 illustrated in FIG. 21, for example, may be used as a modification of the fourth embodiment.

Modification of Fourth Embodiment

FIG. 21 is a configuration diagram of a radiation monitor 100G according to a modification of the fourth embodiment.

The radiation monitor 100G illustrated in FIG. 21 includes the mirror 25, an analysis/display device 16G, and the like. The mirror 25 selectively transmits or reflects light according to the wavelength of light incident on itself. That is, light incident on the mirror 25 from the light emitting unit 21 through the optical fiber 13s passes through the mirror 25 and is guided to the optical fiber 13q. Further, the light having the emission wavelength of the radiation detection elements 11a and 12a enters the mirror 25 through the optical fiber 13q, is reflected by the mirror 25, and is guided to the optical fiber 13r.

Incidentally, an "optical transmission line" that transmits light from the light emitting unit 21 to the radiation detection elements 11a and 12a and transmits light from the radiation detection elements 11a and 12a to the light detection unit 14 includes the optical fibers 13p, 13q, 13r, and 13s, and the mirror 25.

Then, the analysis/display device 16G executes predetermined processing based on the light intensity of the light emitting unit 21 and the count rate of the electric pulses during the inspection of the radiation monitor 100G. That is, the analysis/display device 16G determines whether the light emitting unit 21 has deteriorated or whether other components (the radiation detection elements 11a and 12a and the optical fiber 13q and the like) have deteriorated, and displays a result of the determination. Even with such a configuration, the reliability of the radiation monitor 100G can be enhanced as compared with the related art.

Fifth Embodiment

A fifth embodiment is different from the first embodiment in that the radiation detection unit 11 (see FIG. 22) is connected to an optical coupler 19 through an optical fiber 13t, and the radiation detection unit 12 is connected to the optical coupler 19 through an optical fiber 13u. Incidentally, the other configurations are the same as those in the first embodiment. Therefore, only portions different from those of the first embodiment will be described, and overlapping portions will not be described.

Figure 22:
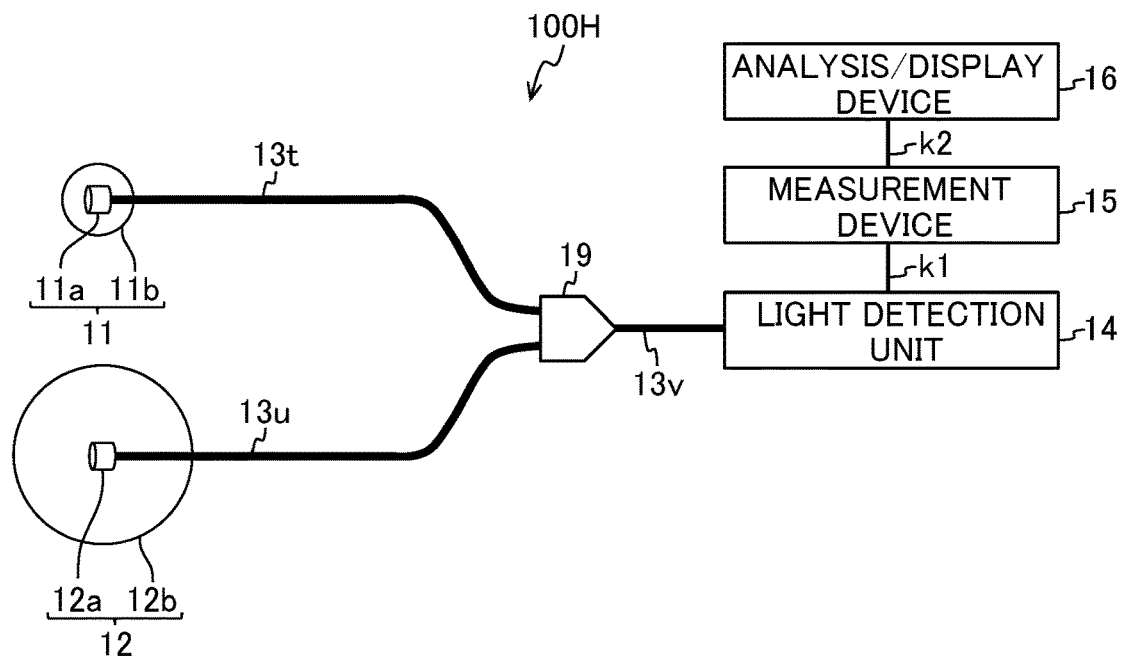
FIG. 22 is a configuration diagram of a radiation monitor according to a modification of a fifth embodiment of the present invention.

FIG. 22 is a configuration diagram of a radiation monitor 100H according to the fifth embodiment.

As illustrated in FIG. 22, the radiation monitor 100H includes the optical coupler 19 and the like in addition to the radiation detection units 11 and 12, the optical fibers 13t, 13u, and 13v.

The optical fibers 13t, 13u, and 13v and the optical coupler 19 are "optical transmission lines" that transmit light generated by the radiation detection elements 11a and 12a to merge. The optical coupler 19 is provided at a merging point of the light generated by the radiation detection elements 11a and 12a. Further, the "optical transmission line" branches from the optical coupler 19 into two lines toward the respective radiation detection elements 11a and 12a.

The light generated by the radiation detection element 11a is guided to the optical coupler 19 through the optical fiber 13t. The light generated by the radiation detection element 12a is guided to the optical coupler 19 through the optical fiber 13u. Then, the light after merging by the optical coupler 19 is guided to the light detection unit 14 through the optical fiber 13v.

Effect

According to the fifth embodiment, the radiation can be detected with high accuracy regardless of the magnitude of the radiation energy or the irradiation angle by causing the light from the radiation detection elements 11a and 12a to merge at the optical coupler 19. That is, an error caused by radiation detection can be reduced as compared with the related art by appropriately selecting materials and thicknesses of the housings 11b and 12b.

Modifications

Although the radiation monitor 100 and the like according to the present invention have been described in the respective embodiments as described above, the present invention is not limited to these descriptions, and various changes can be made.

For example, the case where each of the radiation detection elements 11a and 12a is Nd:YAG has been described in the respective embodiments, but the invention is not limited thereto. That is, at least one of the radiation detection elements 11a and 12a may contain a scintillation element (for example, Nd:YAG) in which yttrium aluminum garnet as a base material contains a rare earth element.

Further, the configuration where the radiation monitor 100 (see FIG. 1) includes the two radiation detection units 11 and 12 has been described in the first embodiment, but the invention is not limited thereto. That is, in a configuration including three or more radiation detection units (not illustrated) each having a radiation detection element (not illustrated) housed in a housing (not illustrated), the respective radiation detection elements may be connected in series. In such a configuration, the plurality of housings (not illustrated) include at least one housing made of the first material and another housing made of the second material. It becomes possible to detect radiation with even higher accuracy by appropriately selecting not only the number of these housings but also materials and thicknesses thereof. Incidentally, a housing made of a third material may be present.

Further, the same can apply to the fifth embodiment (see FIG. 22). That is, it may be configured such that three or more radiation detection units (not illustrated) are connected to an optical coupler (not illustrated) through optical fibers (not illustrated).

Further, the configuration where the measurement device 15 (see FIG. 1) and the analysis/display device 16 are separate bodies has been described in the respective embodiments, but the present invention is not limited thereto. That is, a device having the functions of the measurement device 15 and the analysis/display device 16 may be provided.

Further, the configuration where the radiation detection elements 11a and 12a (see FIG. 1) are columnar has been described in the respective embodiments, but the present invention is not limited thereto. For example, the radiation detection elements 11a and 12a may be polygonal pillars or spherical.

Further, the respective embodiments can be appropriately combined. For example, the analysis/display device 16F may identify a point where a failure occurs in a configuration where the fourth embodiment (see FIG. 13) and the fifth embodiment (see FIG. 22) are combined.

Further, the configuration where the radiation monitor 100 is installed in the nuclear power plant has been described in the respective embodiments, but the invention is not limited thereto. Examples of other installation sites of the radiation monitor 100 include the following sites. That is, the radiation monitor 100 may be installed in a used-fuel storage pool in the nuclear power plant, inside or outside of a reactor pressure vessel, inside or outside a reactor container vessel, inside or outside a suppression pool, inside or outside a reactor building, in a reprocessing facility, and the like. Further, the radiation monitor 100 may be installed in a radiation medical facility, or may be used for detection of fuel debris (generated as molten reactor fuel cooled and solidified).

Further, the respective embodiments have been described in detail in order to describe the present invention in an easily understandable manner, and are not necessarily limited to one including the entire configuration that has been described above. Further, addition, deletion or substitution of other configurations can be made with respect to some configurations of the embodiments. Further, only mechanisms and configurations considered to be necessary for the description have been illustrated as above, and all the mechanisms and configurations required as a product are not necessarily illustrated.

REFERENCE SIGNS LIST 100, 100A, 100B, 100C, 100D, 100E, 100F, 100G, 100H radiation monitor
11, 11B radiation detection unit
11a radiation detection element
11b, 11Bb housing (housing made of first material)
12, 12B radiation detection unit
12a radiation detection element
12b, 12Bb housing (another housing made of second material)
13p, 13q, 13r, 13s, 13t, 13u, 13v optical fiber (optical transmission line)
14 light detection unit
15 measurement device (analysis unit)
16, 16F, 16G analysis/display device (analysis unit)
17 sealed container
18 optical connector
19 optical coupler (optical transmission line)
21 light emitting unit
22 light emitting unit control device
23 optical branching unit (optical transmission line)
24 wavelength selection unit (optical transmission line)
25 mirror (optical transmission line)
K serially connected body
i1 end face (polished portion)
j light-reflecting material
n1, n2 hemispherical portion (hemispherical portion)
O1, O2 center

The invention claimed is:

1. A radiation monitor comprising:
a plurality of radiation detectors each of which comprises a radiation detection element that emits light with incidence of radiation, and a housing that houses the radiation detection element;
an optical transmission line that transmits light generated by the plurality of radiation detection elements and causes the light to merge;
a light detector that converts the light after being merged and guided to the light detector through the optical transmission line into an electric pulse; and a processor configured to calculate a dose rate of radiation based on a count rate of the electric pulse, wherein the plurality of housings include at least one housing made of a first material and another housing made of a second material different from the first material, wherein, within a predetermined angle range from a predetermined reference line passing through the housing, the other housing is not arranged, and wherein the reference line passes through a center based on a curvature of a spherical surface of the hemispherical portion.

2. The radiation monitor according to claim 1, wherein the plurality of radiation detection elements are connected in series through the optical transmission line.

3. The radiation monitor according to claim 2, wherein the optical transmission line comprises an optical connector provided at a portion connecting the light detectors and a serially connected body in which the plurality of the radiation detection elements are directly connected.

4. The radiation monitor according to claim 1, wherein the optical transmission line has an optical coupler provided at a merging point of light generated by the plurality of radiation detection elements, and branches from the optical coupler into a plurality of lines to the respective radiation detection elements.

5. The radiation monitor according to claim 1, wherein a thickness of the housing made of the first material is different from a thickness of the other housing made of the second material.

6. The radiation monitor according to claim 1, wherein each of the plurality of housings includes a hemispherical portion as an outer shape.

7. The radiation monitor according to claim 1, wherein each of the plurality of radiation detection elements is provided with a polished portion, which has been optically polished, in a vicinity of a connection point with the optical transmission line, and a light-reflecting material is provided in an area other than the vicinity of the connection point.

8. The radiation monitor according to claim 1, wherein the plurality of the radiation detectors are housed in one sealed container.

9. A radiation monitor comprising:
a plurality of radiation detectors each of which comprises a radiation detection element that emits light with incidence of radiation, and a housing that houses the radiation detection element;
an optical transmission line that transmits light generated by the plurality of radiation detection elements and causes the light to merge;
a light detector that converts the light after being merged and guided to the light detector through the optical transmission line into an electric pulse;
a processor configured to calculate a dose rate of radiation based on a count rate of the electric pulse; and
a light emitting element that emits light having a wavelength different from emission wavelengths of the plurality of radiation detection elements,
wherein the plurality of housings include at least one housing made of a first material and another housing made of a second material different from the first material,
wherein each of the plurality of radiation detection elements has sensitivity to radiation and also has sensitivity to light, and emits light at the emission wavelength with incidence of radiation or light,
wherein the optical transmission line transmits light from the light emitting element to the plurality of radiation detection elements, and transmits light from the plurality of radiation detection elements to the light detector, and
wherein the processor further configured to determine presence or absence of deterioration of at least the light emitting element based on the count rate of the electric pulses and a light intensity of the light emitting element.

10. A radiation monitor comprising:
a plurality of radiation detectors each of which comprises a radiation detection element that emits light with incidence of radiation, and a housing that houses the radiation detection element;
an optical transmission line that transmits light generated by the plurality of radiation detection elements and causes the light to merge;
a light detector that converts the light after being merged and guided to the light detector through the optical transmission line into an electric pulse;
a processor configured to calculate a dose rate of radiation based on a count rate of the electric pulse; and
a light emitting element that emits light having a wavelength different from emission wavelengths of the plurality of radiation detection elements,
wherein the plurality of housings include at least one housing made of a first material and another housing made of a second material different from the first material, and
wherein at least one of the plurality of radiation detection elements is a scintillation element containing a rare earth element in yttrium aluminum garnet which is a base material.

* * * * *